(12) United States Patent
Fukuhara et al.

(10) Patent No.: US 8,891,882 B2
(45) Date of Patent: Nov. 18, 2014

(54) IMAGE PROCESSING APPARATUS AND METHOD

(75) Inventors: Takahiro Fukuhara, Tokyo (JP); Hitoshi Kiya, Tokyo (JP)

(73) Assignees: Sony Corporation, Tokyo (JP); Tokyo Metropolitan University, Tokyo (JP)

( * ) Notice: Subject to any disclaimer, the term of this patent is extended or adjusted under 35 U.S.C. 154(b) by 348 days.

(21) Appl. No.: 13/487,862

(22) Filed: Jun. 4, 2012

(65) Prior Publication Data

US 2012/0314964 A1    Dec. 13, 2012

(30) Foreign Application Priority Data

Jun. 9, 2011  (JP) ................................ 2011-128879

(51) Int. Cl.
  *G06K 9/62*   (2006.01)
  *G06K 9/38*   (2006.01)
  *H04N 19/126* (2014.01)
  *H04N 19/30*  (2014.01)

(52) U.S. Cl.
  CPC ............ *G06K 9/38* (2013.01); *H04N 19/00424* (2013.01); *H04N 19/00096* (2013.01)
  USPC ........... 382/224; 382/246; 382/276; 382/266; 382/233

(58) Field of Classification Search
  CPC . G06K 9/00664; G06K 9/00711; G06K 9/38; G06F 17/30265; G06T 7/0081; G06T 5/001; G06T 11/60; H04N 7/50; H04N 7/26106
  USPC .......................... 382/224, 233, 246, 266, 276
  See application file for complete search history.

(56) References Cited

U.S. PATENT DOCUMENTS

2005/0244071 A1* 11/2005 Zaharia et al. ................ 382/251

OTHER PUBLICATIONS

Winken et al, "Bit-depth scalable viedeo coding", IEEE, 2007.*
Stuart P. Lloyd, "Least Squares Quantization in PCM", IEEE Transactions on Information Theory, vol. IT-28, No. 2, Mar. 1982. pp. 129-137.

* cited by examiner

*Primary Examiner* — Ruiping Li
(74) *Attorney, Agent, or Firm* — Frommer Lawrence & Haug LLP; William S. Frommer

(57) ABSTRACT

There is provided an image processing apparatus including a zero class detecting unit that detects a zero class in which an appearance frequency of a pixel value is zero from among a plurality of classes into which pixel values of an image are classified according to pixel value magnitude, and a non-zero class converting unit that converts the zero class into a non-zero class in which the appearance frequency of the pixel value is one or more, without updating a total number of the classes, by updating a range of the zero class detected by the zero class detecting unit. The present disclosure can be applied to an image processing apparatus.

13 Claims, 24 Drawing Sheets

EXAMPLE OF N(12)-BIT MEDICAL IMAGE
(Ne = 1835)

FIG.18

(EXAMPLE OF N(12)-BIT MEDICAL IMAGE)

| PROCESS | NUMBER OF BITS (L BITS) AFTER BIT TRANSFORM | | | |
|---|---|---|---|---|
| | 11 BITS | 10 BITS | 9 BITS | 8 BITS |
| ROUNDING DOWN | 75.49 | 67.07 | 60.10 | 53.70 |
| ROUNDING OFF | 75.80 | 67.95 | 60.61 | 54.92 |
| LLOYD-MAX | 84.22 | 75.34 | 66.52 | 64.51 |
| PRESENT TECHNIQUE | ∞ | 84.46 | 75.02 | 69.45 |

FIG.19

(EXAMPLE IN WHICH NUMBER OF DIVIDED BLOCKS IS 4)

| PROCESS | NUMBER OF BITS (L BITS) AFTER BIT TRANSFORM | | | |
|---|---|---|---|---|
| | 11 BITS | 10 BITS | 9 BITS | 8 BITS |
| ROUNDING DOWN | 75.49 | 67.07 | 60.10 | 53.70 |
| ROUNDING OFF | 75.80 | 67.95 | 60.61 | 54.92 |
| LLOYD-MAX | 88.76 | 75.76 | 70.90 | 65.19 |
| PRESENT TECHNIQUE | $\infty$ | 85.38 (+0.92) | 76.08 (+1.06) | 70.04 (+0.59) |

FIG.20

(EXAMPLE IN WHICH NUMBER OF DIVIDED BLOCKS IS 16)

| PROCESS | NUMBER OF BITS (L BITS) AFTER BIT TRANSFORM | | | |
|---|---|---|---|---|
| | 11 BITS | 10 BITS | 9 BITS | 8 BITS |
| ROUNDING DOWN | 75.49 | 67.07 | 60.10 | 53.70 |
| ROUNDING OFF | 75.80 | 67.95 | 60.61 | 54.92 |
| LLOYD-MAX | 93.62 | 77.64 | 72.65 | 66.87 |
| PRESENT TECHNIQUE | ∞ | 89.99 (+5.53) | 78.21 (+3.19) | 71.89 (+2.44) |

FIG.21

(EXAMPLE IN WHICH NUMBER OF DIVIDED BLOCKS IS 100)

| PROCESS | NUMBER OF BITS (L BITS) AFTER BIT TRANSFORM | | | |
|---|---|---|---|---|
| | 11 BITS | 10 BITS | 9 BITS | 8 BITS |
| ROUNDING DOWN | 75.49 | 67.07 | 60.10 | 53.70 |
| ROUNDING OFF | 75.80 | 67.95 | 60.61 | 54.92 |
| LLOYD-MAX | 110.32 | 82.52 | 76.24 | 70.46 |
| PRESENT TECHNIQUE | ∞ | ∞ (−) | 86.20 (+11.18) | 76.21 (+6.76) |

IMAGE PROCESSING APPARATUS AND METHOD

BACKGROUND

The present disclosure relates to an image processing apparatus and method, and more particularly, to an image processing apparatus and method that are capable of suppressing a quantization error.

In the related art, bit transform techniques for performing transforms from a high bit depth to a low bit depth have usually been used as a quantization technique for image processing or the like. In other word, an N-bit image is transformed into an L-bit image (N>L) by a quantization process. On the other hand, an inverse transform process from a low bit depth to a high bit depth corresponds to inverse quantization. A linear quantization technique has usually been used as an image quantization technique. However, the linear quantization technique is low in computation cost but relatively large in a quantization error. For this reason, when an image of a high bit depth is transformed into an image of a low bit depth by quantization, and then the image of the low bit depth is transformed into the image of the high bit depth by inverse quantization (is returned to an original bit depth), the restored image of the high bit depth (the image which has been subjected to the quantization and inverse quantization processes) may remarkably deteriorate compared to the original image (the image prior to the quantization and inverse quantization processes).

In this regard, a Lloyd-Max quantization technique has been proposed (for example, see Lloyd, "Least squares quantization in PCM", IEEE Transactions, Information Theory, vol. IT-28, no. 2, pp. 129-137, March 1982). Generally, the Lloyd-Max quantization technique has been known as a quantization technique which results in little image distortion.

SUMMARY

However, the Lloyd-Max quantization technique does not consider "sparsity" shown in a high-dynamic range image or a RAW image acquired directly from an imaging element. In other words, it is difficult for the Lloyd-Max quantization technique to obtain an optimum solution to a sparse image having deviation in a histogram.

The present disclosure is made in light of the foregoing, and it is desirable to suppress quantization error even in a sparse image having deviation in a histogram.

According to another embodiment of the present disclosure, there is provided an image processing apparatus, including: a zero class detecting unit that detects a zero class in which an appearance frequency of a pixel value is zero from among a plurality of classes into which pixel values of an image are classified according to pixel value magnitude; and a non-zero class converting unit that converts the zero class into a non-zero class in which the appearance frequency of the pixel value is one or more, without updating a total number of the classes, by updating a range of the zero class detected by the zero class detecting unit.

The non-zero class converting unit may include a class integrating unit that integrates a zero class detected by the zero class detecting unit into a neighboring class until the appearance frequency of the pixel value is equal to or more than the number of integrated classes, and a class dividing unit that divides a class integrated by the class integrating unit into classes which are equal in number to the number of classes before integration such that all classes become non-zero classes.

The image processing apparatus may further include a class boundary deciding unit that decides a boundary of the class, a class configuring unit that allocates each pixel value to each class delimited by the boundary decided by the class boundary deciding unit according to a value thereof, and a representative value deciding unit that calculates a gravity center of a pixel value allocated by the class configuring unit in each class delimited by the boundary decided by the class boundary deciding unit and decides the gravity center as a representative value.

The class boundary deciding unit may decide the boundary so that a range between a maximum value and a minimum value of the pixel value is divided into classes which are smaller in number than a bit depth of the pixel value.

The representative value deciding unit may calculate the gravity center in each class and decides the gravity center as the representative value after the non-zero class converting unit converts a zero class into a non-zero class.

The class boundary deciding unit may decide an intermediate value of representative values of neighboring classes decided by the representative value deciding unit as the boundary of the class.

The image processing apparatus may further include a table generating unit that generates a table in which a representative value of each class decided by the representative value deciding unit is associated with an index of each class.

The image processing apparatus may further include a transforming unit that transforms each pixel value of the image into a representative value, of a class corresponding to the pixel value, decided by the representative value deciding unit, and an index image generating unit that transforms the representative value transformed from each pixel value by the transforming unit into an index which is identification information of the class of the representative value using the table generated by the table generating unit.

The image processing apparatus may further include an inverse quantizing unit that transforms the index into the representative value using the table generated by the table generating unit.

The class boundary deciding unit may decide the boundary so that a range between a maximum value and a minimum value of all pixels of a plurality of images is divided into a plurality of classes, the class configuring unit may allocate all pixel values of the plurality of images to classes delimited by the boundary decided by the class boundary deciding unit according to a value thereof, and the table generating unit may generate a table, common to the plurality of images, in which the representative value of each class decided by the representative value deciding unit is associated with an index of each class.

The image processing apparatus may further include an image block dividing unit that divides the image into a plurality of blocks, and each of the class boundary deciding unit, the class configuring unit, the representative value deciding unit, the zero class detecting unit, and the non-zero class converting unit may independently perform a process for each of the blocks divided from the image by the image block dividing unit.

The image processing apparatus may further include an inverse quantizing unit that independently performs a process for transforming the index into the representative value for each block using the table generated by the table generating unit.

According to another embodiment of the present disclosure, there is provided an image processing method of an image processing apparatus, including detecting, at a zero class detecting unit, a zero class in which an appearance frequency of a pixel value is zero from among a plurality of classes into which pixel values of an image are classified according to pixel value magnitude, and transforming, at a non-zero class converting unit, the zero class into a non-zero class in which the appearance frequency of the pixel value is one or more, without updating a total number of the classes, by updating a range of the detected zero class.

According to another embodiment of the present disclosure, a zero class in which an appearance frequency of a pixel value is zero is detected, from among a plurality of classes into which pixel values of an image are classified according to pixel value magnitude, and the zero class is transformed into a non-zero class in which the appearance frequency of the pixel value is one or more, without updating a total number of the classes, by updating a range of the detected zero class.

According to the embodiments of the present disclosure described above, an image can be processed. Particularly, a quantization error can be suppressed.

BRIEF DESCRIPTION OF THE DRAWINGS

FIG. 18 is a diagram for explaining an example of an image quality after quantization and inverse quantization;

FIG. 19 is a diagram illustrating another example of an image quality after quantization and inverse quantization;

FIG. 20 is a diagram illustrating another example of an image quality after quantization and inverse quantization;

FIG. 21 is a diagram illustrating another example of an image quality after quantization and inverse quantization;

DETAILED DESCRIPTION OF THE EMBODIMENTS

Figure 1:
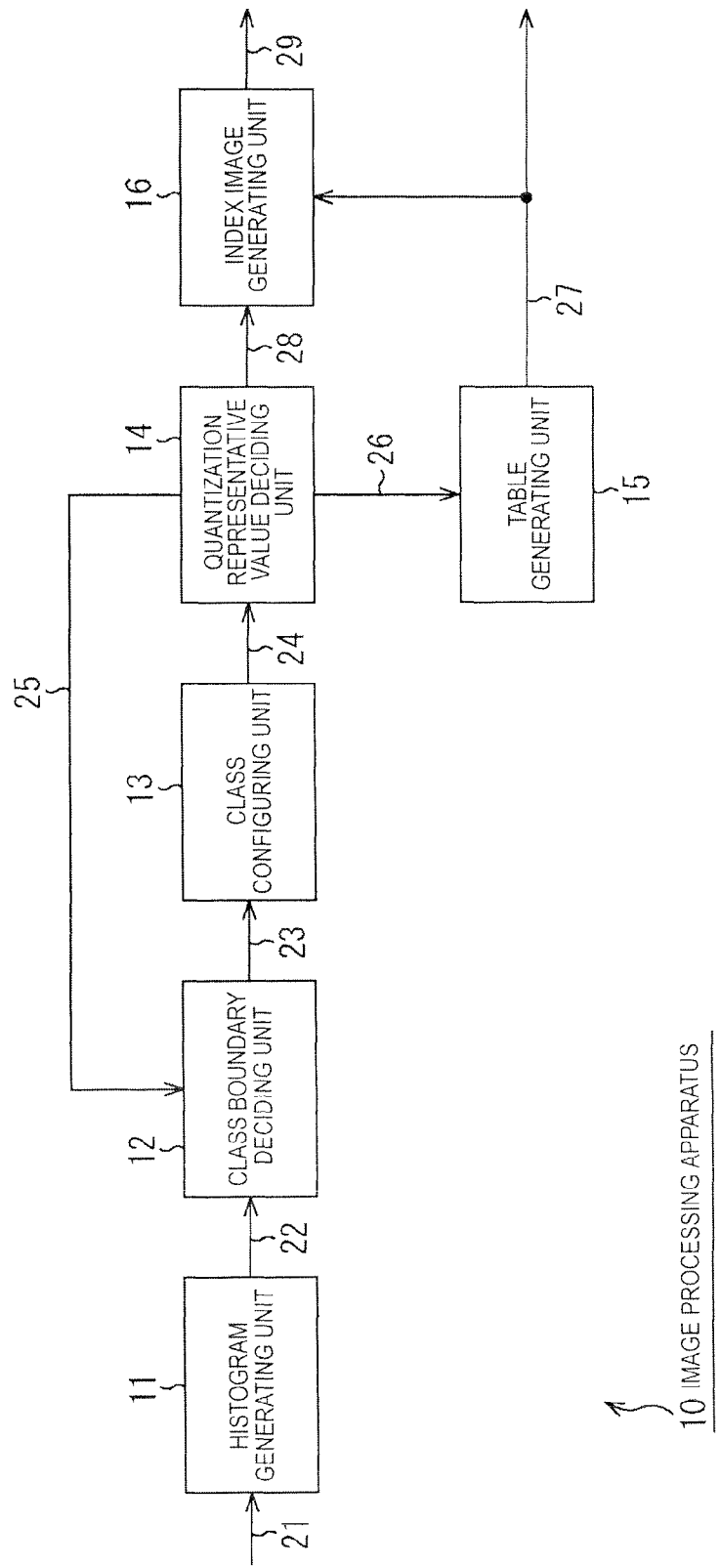
FIG. 1 is a block diagram illustrating an example of a main configuration of an image processing apparatus that performs quantization by a Lloyd-Max quantization technique.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present disclosure (hereinafter referred to as "embodiments") will be described. A description will be made in the following order:

1. First Embodiment (Lloyd-Max Technique)
2. Second Embodiment (Image Processing Apparatus That Performs Quantization)
3. Third Embodiment (Image Processing Apparatus That Performs Quantization for Each Block)
4. Fourth Embodiment (Image Processing Apparatus That Performs Inverse Quantization)
5. Fifth Embodiment (Image Processing Apparatus That Performs Inverse Quantization for Each Block)
6. Sixth Embodiment (Image Processing Apparatus That Generates Table Corresponding to Plurality of Frames)
7. Seventh Embodiment (Personal Computer)

1. First Embodiment

[Lloyd-Max Technique]

First, the Lloyd-Max technique will be described. "f" is defined as each pixel value of an image (an N-bit image) P(x,y) in which a bit depth is N bits, and "p(f)" is defined as a probability density function thereof. In this case, Formulas (1) and (2) are established: Here, parameters are as follows.

[Math. 1]

$$0 \leq a_L \leq f \leq a_U \leq 2^N - 1 \quad (1)$$

[Math. 2]

$$\int_{a_L}^{a_U} p(f) df = 1 \quad (2)$$

Here, parameters are as follows:
$a_L$: minimum pixel value of image
$a_U$: maximum pixel value of image
d: section boundary value of quantization
r: quantization representative value When f is changed to f' by quantization/inverse quantization of the image P(x,y), a square error can be represented by the following Formula (3):

[Math. 3]

$$\epsilon = \int_{a_L}^{a_U} (f-f')^2 p(f) df \quad (3)$$

In the quantization of the Lloyd-Max technique, when the N-bit image is quantized into the L-bit image, a value range of $(a_U - a_L)$ is divided into $2^L$ classes. When $d_n (n=0, 1, 2, \ldots, 2^L)$ is defined as a section boundary (class boundary) and $r_n (n=0, 1, 2, \ldots, 2^L-1)$ is defined as a representative value of each class, i.e., a pixel value after inverse quantization, $d_n$ can be represented by the following Formula (4):

[Math. 4]

$$d_0 < r_0 < d_1 < r_1 < \ldots < d_{2^L}$$

$$d_0 = a_L$$

$$d_{2^L} = a_U \quad (4)$$

The following Formula (5) can be derived from Formula (3) and Formula (4):

[Math. 5]

$$\varepsilon = \sum_{n=0}^{2^L-1} \int_{d_n}^{d_{n+1}} (f - r_n)^2 p(f) df \quad (5)$$

The Lloyd-Max quantization technique aims to minimize "$\epsilon$" of Formula (5). Thus, since Formula (5) includes $d_n$ and $r_n$ as variables, it is desirable to obtain a section boundary $d_k$ and a representative value $r_k$ of each class that satisfy the following Formula (6) in all k making "$\epsilon$" minimum:

[Math. 6]

$$\frac{\partial \varepsilon}{\partial d_k} = \frac{\partial \varepsilon}{\partial r_k} = 0 \ (k = 0, 1, \ldots, 2^L) \quad (6)$$

First, by solving for $d_k$, the following Formula (7) is established:

[Math. 7]

$$\frac{\partial \varepsilon}{\partial d_k} = \frac{\partial}{\partial d_k} \int_{d_{k-1}}^{d_k} (f - r_{k-1})^2 p(f) df + \frac{\partial}{\partial d_k} \int_{d_k}^{d_{k+1}} (f - r_k)^2 p(f) df \quad (7)$$

$$= (d_k - r_{k-1})^2 p(d_k) - (d_k - r_k)^2 p(d_k) = 0$$

That is, the following Formula (8) is established:

[Math. 8]

$$(d_k - r_{k-1}) = -(d_k - r_k) \quad (8)$$

Thus, the following Formula (9) can be derived:

[Math. 9]

$$d_i = \frac{1}{2}(r_{i-1} + r_i) \quad (9)$$

This means that the section boundary is an average of two corrected representative values.

Next, by solving for $r_k$, the following Formula (10) is established:

[Math. 10]

$$\frac{\partial \varepsilon}{\partial r_k} = \frac{\partial}{\partial r_k} \int_{d_{k-1}}^{d_k} (f - r_k)^2 p(f) df \quad (10)$$

$$= -2 \int_{d_{k-1}}^{d_k} (f - r_k)^2 p(f) df = 0$$

This solution can be represented by the following Formula (11):

[Math. 11]

$$r_i = \frac{\int_{d_k}^{d_{k+1}} f p(f) df}{\int_{d_k}^{d_{k+1}} p(f) df} \quad (11)$$

This means that the representative value becomes a gravity center of each class.

[Image Processing Apparatus that Performs Quantization by the Lloyd-Max Technique]

FIG. 1 is a block diagram illustrating an example of a main configuration of an image processing apparatus. The image processing apparatus 10 illustrated in FIG. 1 performs a bit depth transform process (that is, a quantization process) that transforms a bit depth of each pixel value of an image from N bits to L bits (N>L) using the above-described Lloyd-Max technique.

As illustrated in FIG. 1, the image processing apparatus 10 includes a histogram generating unit 11, a class boundary deciding unit 12, a class configuring unit 13, a quantization representative value deciding unit 14, a table generating unit 15, and an index image generating unit 16.

The histogram generating unit 11 generates a histogram of all pixel values of an input image (arrow 21), obtains a maximum value and a minimum value of a pixel value, and supplies the maximum value and the minimum value to the class boundary deciding unit 12 (arrow 22).

The class boundary deciding unit 12 decides a class boundary for dividing a range between the supplied maximum value and the minimum value of the histogram into $2^L$ classes at equal intervals, and supplies the histogram and information of the class boundary to the class configuring unit 13 (arrow 23).

The class configuring unit 13 sorts all pixel values of the input image into classes respectively corresponding to values thereof. The class configuring unit 13 supplies the histogram, the information related to the class boundary, information of a class allocated to each pixel value, and the like to the quantization representative value deciding unit 14 (arrow 24).

The quantization representative value deciding unit 14 obtains a gravity center $r_i$ of the pixel value for each class, and sets the gravity center $r_i$ as a representative value of a corresponding class. When a representative value of a certain class is updated, the quantization representative value deciding unit 14 returns the histogram, the information related to the class boundary, the information of a class allocated to each pixel, the information related to the representative value of each class, and the like to the class boundary deciding unit 12 (arrow 25) in order to update the class boundary.

The class boundary deciding unit 12 decides a medium value of two neighboring representative values as a new class boundary. The class boundary deciding unit 12 decides one class boundary on each of all combinations of two neighboring representative values, that is, decides one class boundary on each of all medium values between neighboring representative values. The class configuring unit 13 sorts all pixel values of the input image on an updated class. The quantization representative value deciding unit 14 decides the representative value (the gravity center $r_i$) on the updated class in the above described manner.

When the process for deciding the class boundary, classifying each pixel value, and deciding the representative value of each class is repeated as described above and then the representative value need not be updated, the quantization representative value deciding unit 14 supplies the decided representative value of each class to the table generating unit 15 (arrow 26).

The table generating unit 15 generates a table in which an index (which is an identification number of each class and hereinafter referred to as a "class number") is allocated to the representative value of each class, supplies the table to the index image generating unit 16, and outputs the table to the outside of the image processing apparatus 10 (arrow 27).

Further, the quantization representative value deciding unit 14 transforms all pixel values of the input image into corresponding representative values, respectively (that is, quantizes the input image). The quantization representative value deciding unit 14 supplies the representative values (quantized pixel values) to the index image generating unit 16 (arrow 28).

The index image generating unit 16 transforms each quantized pixel value (that is, the representative value of each class) supplied from the quantization representative value deciding unit 14 into an index (class number) using the table supplied from the table generating unit 15, and then outputs the index (class number) to the outside of the image processing apparatus 10 (arrow 29). In other words, the index image generating unit 16 transforms the quantized image into an index image in which each pixel value is represented by an index by transforming the quantized pixel value (representative value) into the index on each pixel.

[Flow of Quantization Process of Lloyd-Max Technique]

Figure 2:
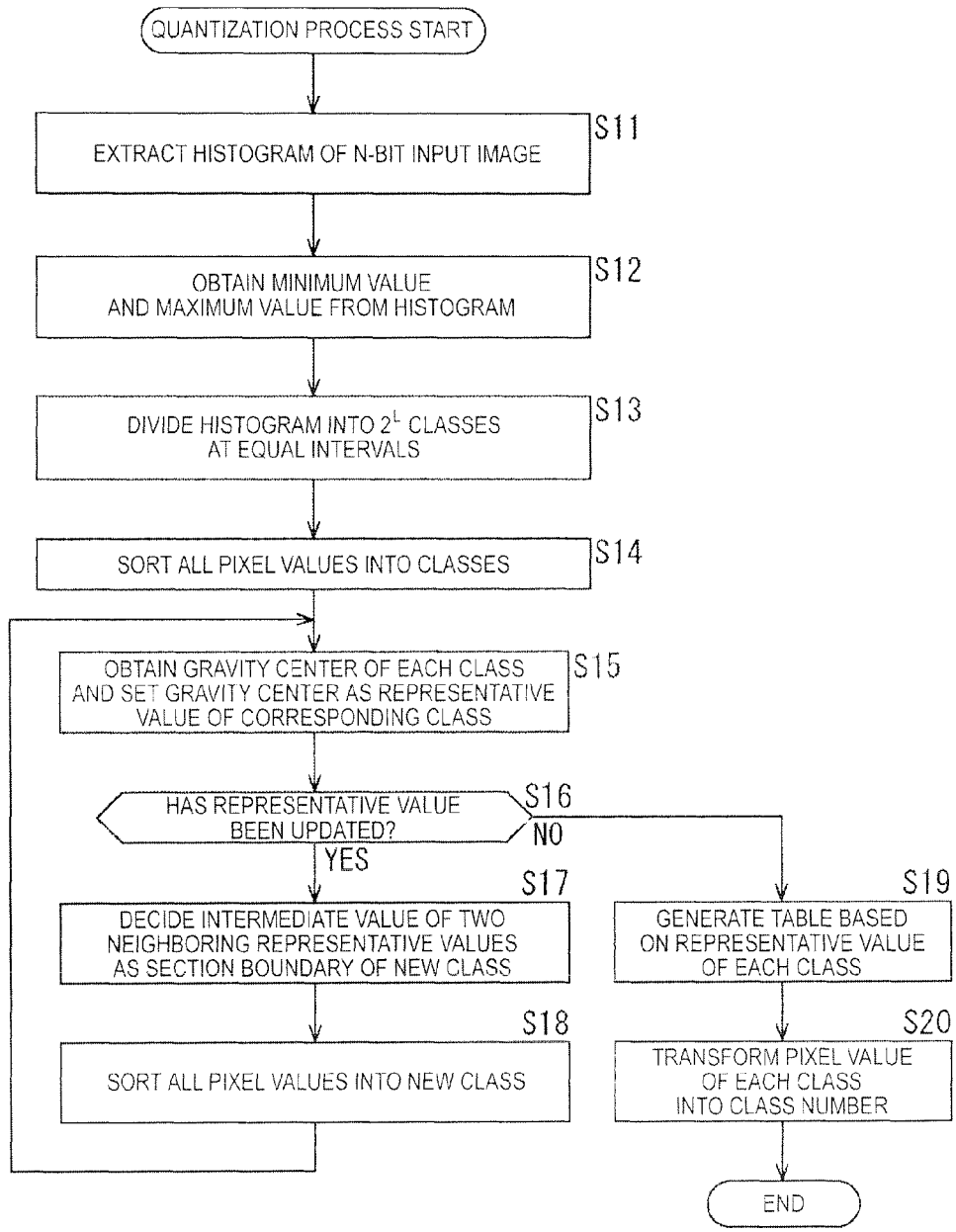
FIG. 2 is a flowchart for explaining an example of a quantization process of the Lloyd-Max quantization technique.

An example of the flow of the quantization process of the Lloyd-Max technique executed by the image processing apparatus 10 will be described with reference to the flowchart of FIG. 2.

When the quantization process starts, in step S11, the histogram generating unit 11 extracts a histogram of an N-bit input image. In step S12, the histogram generating unit 11 obtains a minimum value and a maximum value from the histogram.

In step S13, the class boundary deciding unit 12 divides a range between the maximum value and the minimum value of the histogram into $2^L$ classes at equal intervals. In step S14, the class configuring unit 13 sorts all pixel values of the input image into classes respectively corresponding to values thereof. In step S15, the quantization representative value deciding unit 14 obtains a gravity center of each class, and sets the gravity center as a representative value of a corresponding class.

In step S16, the quantization representative value deciding unit 14 determines whether or not the representative value of each class has been updated by the process of step S15. When it is determined that at least one of representative values has been updated, the quantization representative value deciding unit 14 causes the process to proceed to step S17.

In step S17, the class boundary deciding unit 12 decides an intermediate value of two neighboring representative values as a section boundary of a new class. In other words, the class boundary deciding unit 12 updates the section boundary according to the updated representative value. In step S18, the class configuring unit 13 sorts all pixel values of the input image into updated classes respectively corresponding to values thereof. When the process of step S18 ends, the class configuring unit 13 causes the process to return to step S15, and then repeats step S15 and subsequent processes.

In other words, steps S15 to S18 are repeatedly executed until it is determined in step S16 that no representative values have been updated. When it is determined in step S16 that no representative values have been updated, the quantization representative value deciding unit 14 causes the process to proceed to step S19.

In step S19, the table generating unit 15 generates a table in which a representative value of each class is associated with an index (class number). In step S20, the quantization representative value deciding unit 14 transforms (quantizes) each pixel value of the input image into a representative value of each corresponding class. The index image generating unit 16 transforms the quantized pixel value into the index (class number) using the table generated in step S19.

When the process of step S20 ends, the index image generating unit 16 ends the quantization process.

[Class]

Figure 3:
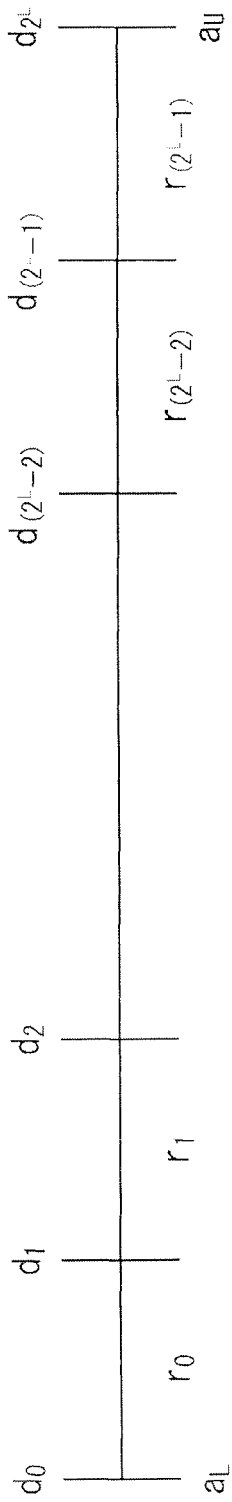
FIG. 3 is a diagram for explaining an example of a relation between a quantization representative value and a boundary value of a class.

FIG. 3 illustrates an example of a class generated by the Lloyd-Max technique. In the case of the Lloyd-Max technique, $2^L-1$ section boundaries d are set at equal intervals between a maximum pixel value $a_U$ and a minimum pixel value $a_L$ of an input image as illustrated in FIG. 3. In other words, $2^L$ sections (classes) are generated. In each section (class), a gravity center of a pixel value is calculated and set as a quantization representative value r of a corresponding class. Accordingly, $2^L$ quantization representative values r are generated.

[Improvement of Lloyd-Max Technique]

Meanwhile, since an image usually has deviation in the frequency of a histogram, an N-bit image does not necessarily have $2^N$ different pixel values. Rather, it is rare to have all of them. Thus, many images have a sparse histogram. Particularly, in the case of a high-dynamic range image or a RAW image, such sparsity is remarkably shown, and the number Ne of types of pixel values is smaller than $2^N$ (Ne<$2^N$).

When Lloyd-Max quantization is performed on an image having a sparse histogram, a class in which all pixel values within a class have an appearance frequency of zero (0) may be generated since the histogram is delimited at equal intervals at the time of classification. For this reason, a denominator of Formula (11) becomes zero (0) (division by zero) and it is difficult to obtain a solution.

In this case, in general purpose mathematical software MATLAB, a representative value is updated by causing two neighboring representative values to become the same value. As a result, a class in which an appearance frequency is zero (0) is merged with a neighboring class. Finally, the update process is repeated until the class having an appearance frequency of 0 disappears.

However, in the case of this method, neighboring classes are combined into one class, and so the number of classes is reduced. This increases a quantization error, and optimality of a solution may not be compensated.

2. Second Embodiment

[Image Processing Apparatus that Performs Quantization]

In this regard, in the present embodiment, a quantization process for performing non-zero class conversion not to reduce the number of classes will be described.

Figure 4:
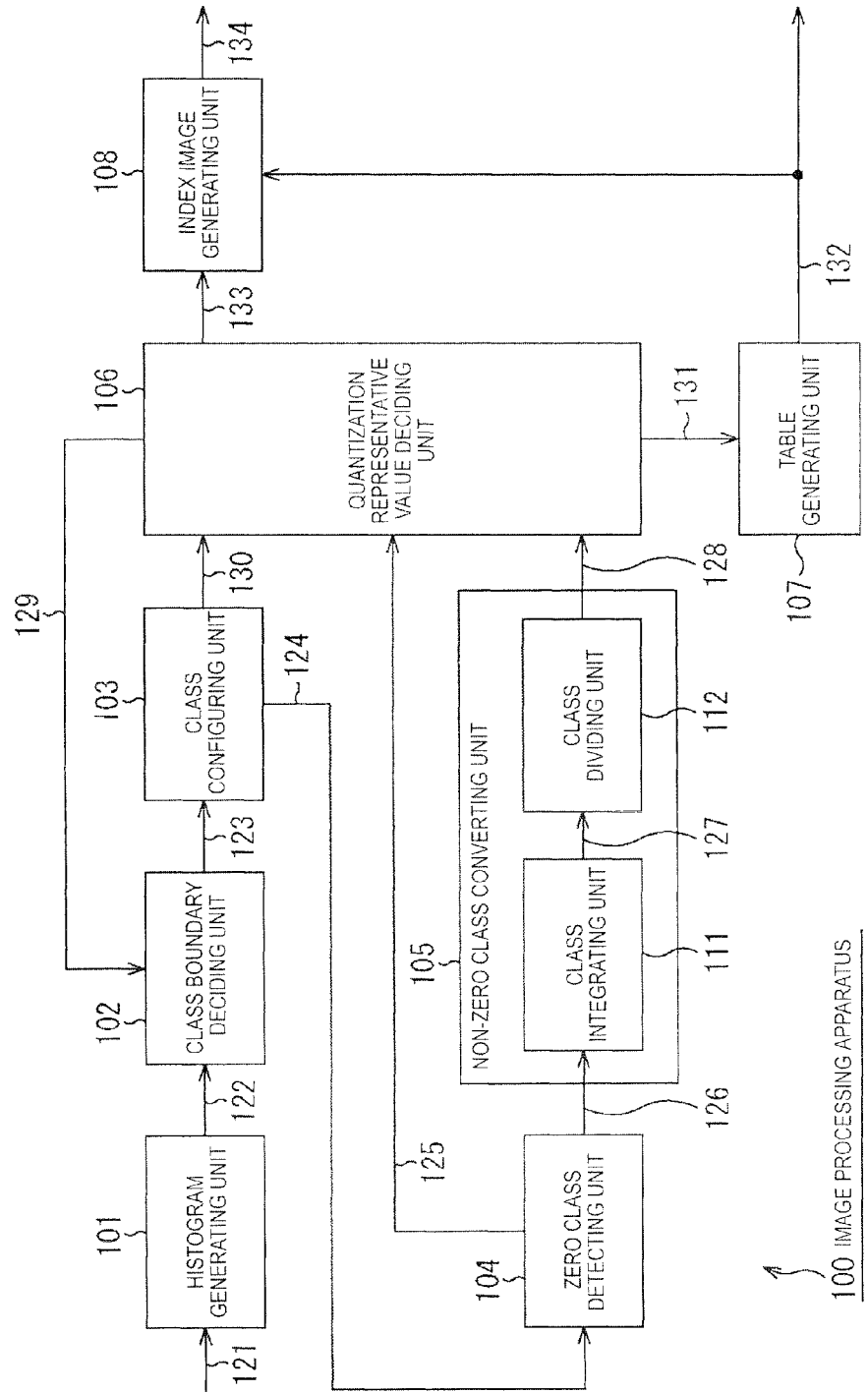
FIG. 4 is a block diagram illustrating an example of a main configuration of an image processing apparatus that performs quantization.

FIG. 4 is a block diagram illustrating an example of a main configuration of an image processing apparatus that performs quantization on an input image. The image processing apparatus 100 illustrated in FIG. 4 performs a bit depth transform process (that is, a quantization process) that transforms a bit depth of each pixel value of an image from N bits to F bits (N>L), similarly to the image processing apparatus 10 of FIG. 1. However, the image processing apparatus 100 performs a quantization process described below instead of the above-described Lloyd-Max technique.

The image processing apparatus 100 includes a histogram generating unit 101, a class boundary deciding unit 102, a class configuring unit 103, a zero class detecting unit 104, a non-zero class converting unit 105, a quantization representative value deciding unit 106, a table generating unit 107, and an index image generating unit 108.

Further, the non-zero class converting unit 105 includes a class integrating unit 111 and a class dividing unit 112.

The histogram generating unit 101 is the same processing unit as the histogram generating unit 11 of FIG. 1. The histogram generating unit 101 generates a histogram of all pixel values of an input image (arrow 121), obtains a maximum value and a minimum value of a pixel value, and supplies the maximum value and the minimum value to the class boundary deciding unit 102 (arrow 122).

The class boundary deciding unit 102 is the same processing unit as the class boundary deciding unit 12 of FIG. 1. The class boundary deciding unit 102 decides a class boundary for dividing a range between the maximum value and the minimum value of the histogram supplied from the histogram generating unit 101 into $2^L$ classes at equal intervals, and supplies the histogram and information of the class boundary to the class configuring unit 103 (arrow 123).

The class configuring unit 103 is the same processing unit as the class configuring unit 13 of FIG. 1. The class configuring unit 103 sorts all pixel values of the input image into classes respectively corresponding to values thereof. The class configuring unit 103 supplies the histogram, the information related to the class boundary, the information of a class allocated to each pixel, and the like to the quantization representative value deciding unit 106 or the zero class detecting unit 104 (arrow 124 or arrow 130).

More specifically, the class configuring unit 103 first supplies a variety of information to the zero class detecting unit 104 (arrow 124). As will be described later, the zero class detecting unit 104 detects a zero class, and when a zero class is present, the non-zero class converting unit 105 performs non-zero class conversion by integrating and dividing the zero class.

Then, when it is ensured that a zero class is not present through the process of the zero class detecting unit 104 or the non-zero class converting unit 105, the class configuring unit 103 supplies a variety of information to the quantization representative value deciding unit 106 (arrow 130).

The zero class detecting unit 104 checks an appearance frequency of a pixel value in each class and detects a class (zero class) in which an appearance frequency of a pixel value is zero (0), based on the information supplied from the class configuring unit 103. In other words, the zero class detecting unit 104 detects a zero class in which an appearance frequency of a pixel value is zero (0) from among a plurality of classes into which pixel values of an image are classified according to pixel value magnitude.

When no zero class has been detected, the zero class detecting unit 104 supplies a variety of information supplied from the class configuring unit 103 and the detection result to the quantization representative value deciding unit 106 (arrow 125). However, when a zero class has been detected, the zero class detecting unit 104 supplies a variety of information supplied from the class configuring unit 103 and the detection result to the class integrating unit 111 of the non-zero class converting unit 105 (arrow 126).

The non-zero class converting unit 105 converts the zero class detected by the zero class detecting unit 104 into a non-zero class. In other words, the non-zero class converting unit 105 cause the appearance frequency of the pixel value not to be zero (0) (moves the section boundary to the position including one or more pixel values) without updating the total number of classes by updating the position of the section boundary of the zero class.

The class integrating unit 111 of the non-zero class converting unit 105 integrates the zero class detected by the zero class detecting unit 104 into a neighboring non-zero class in which the appearance frequency of the pixel value is not zero (0) based on the information supplied from the zero class detecting unit 104. The class integrating unit 111 supplies the information supplied from the zero class detecting unit 104 and information representing the integration result to the class dividing unit 112 (arrow 127).

The class dividing unit 112 decides a class boundary that causes all classes, integrated by the class integrating unit 111, to be non-zero classes based on the information supplied from the class integrating unit 111, and then performs class division.

For example, when the class integrating unit 111 integrates a certain zero class and a neighboring non-zero class into one class, the class dividing unit 112 divides the integrated class into two. At this time, the class dividing unit 112 performs class division at the position at which a pixel value appears in each of the divided classes. In this way, non-zero class conversion is implemented.

Figure 5:
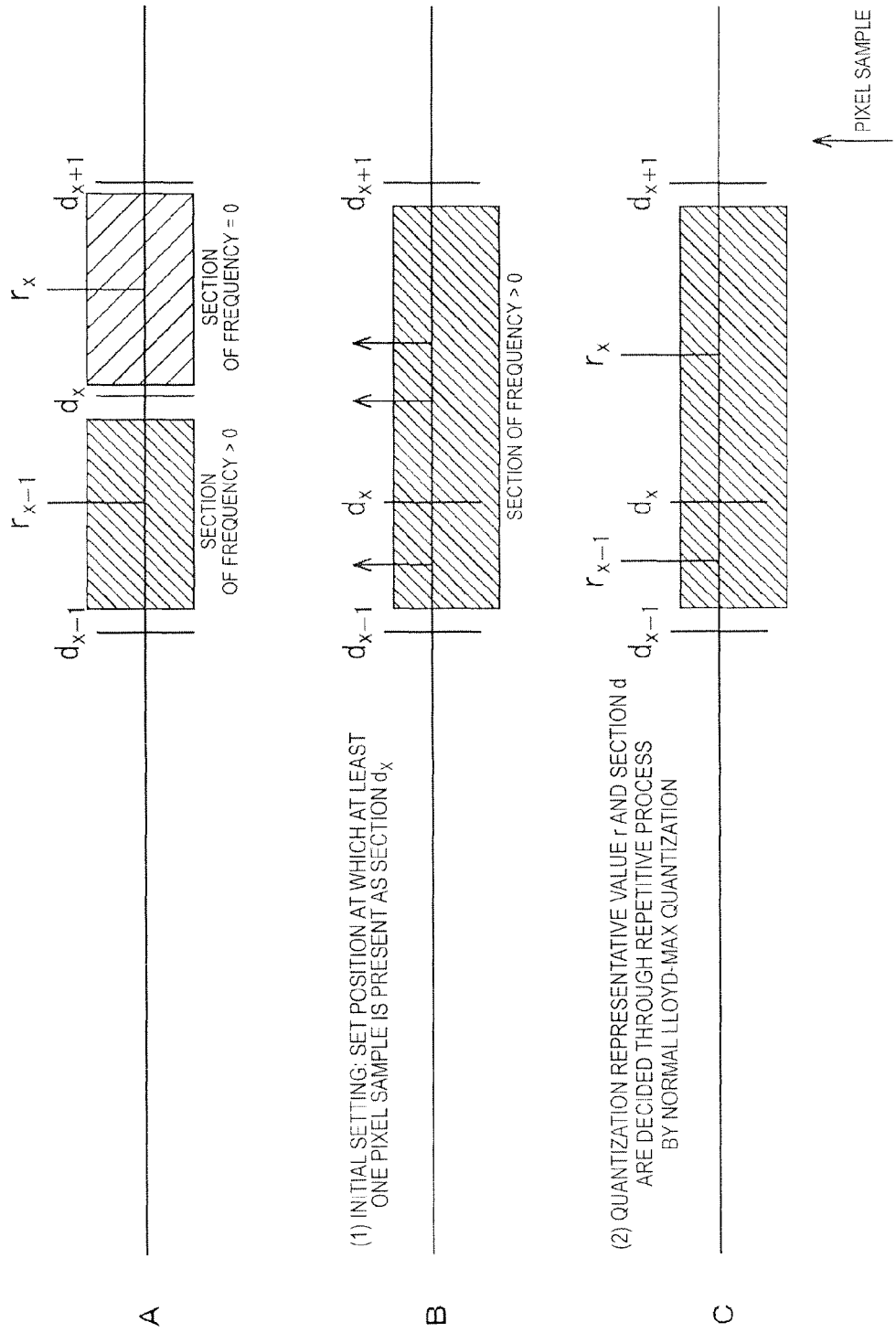
FIGS. 5A to 5C are diagrams for explaining an example of a non-zero class conversion of a zero class.

For example, as illustrated in FIG. 5A, a pixel value is present between section boundaries $d_{x-1}$ and $d_x$ (that is, a non-zero class), but not between section boundaries $d_x$ and $d_{x+1}$ (that is, a zero class). In this case, the class integrating unit 111 integrates a section having a frequency of zero (that is, a section between the section boundaries $d_x$ and $d_{x+1}$) into a neighboring non-zero section (that is, a second between the section boundaries $d_{x-1}$ and $d_x$). Then, the class dividing unit 112 set a position that causes at least one pixel sample to be present in each of a section between section boundaries $d_{x-1}$ and $d_x$ and a section between section boundaries $d_x$ and $d_{x+1}$ of the integrated section (a section between section boundaries $d_{x-1}$ and $d_{x+1}$) as a section boundary $d_x$.

In an example illustrated in FIG. 5B, three pixel samples are present between the section boundaries $d_{x-1}$ and $d_{x+1}$, and the class dividing unit 112 sets a position that causes one pixel sample to be present between section boundaries $d_{x-1}$ and $d_x$ and causes two pixel samples to be present between the section boundaries $d_x$ and $d_{x+1}$ as the section boundary $d_x$.

Through integration and division of a class, a zero class is converted into a non-zero class. Further, the zero class detecting unit 104 detects all zero classes, and the non-zero class converting unit 105 converts each zero class into a non-zero class in the above-described way.

Further, the class integrating unit 111 may integrate three or more neighboring classes (consecutive classes). For example, when an appearance frequency of a pixel value in a class as a result of integration is smaller than the number of integrated classes, it is difficult for the class dividing unit 112 to perform class division for converting all divided classes into non-zero classes (that is, it is difficult to implement non-zero class conversion). In this regard, the class integrating unit 111 integrates the zero class detected by the zero class detecting unit 104 into a neighboring class until an appearance frequency of a pixel value in a class obtained as a result of integration is equal to or more than the number of integrated classes.

For example, when an appearance frequency of a pixel value in a class neighboring a zero class is "0" or "1," even though the class is integrated with a zero class, an appearance frequency of a pixel value in a class obtained as a result of integration is "0" or "1" and smaller than the number of integrated classes, i.e., 2. In this case, the class integrating unit 111 further integrates the class obtained as a result of integration into a neighboring class. As a result, when an appearance frequency of a pixel value in a class obtained as a result of integration is smaller than the number of integrated classes, i.e., 3, the same class integration is repeated. The class integration ends at a point in time when an appearance frequency of a pixel value in a class obtained as a result of integration is equal to or more than the number of integrated classes. The class integrating unit 111 performs this process on each class so that an appearance frequency of a pixel value in all classes can be equal to or more than the number of integrated classes.

As a result, for example, even when a plurality of zero classes are consecutive, even when an appearance frequency of a pixel value in a class next to a zero class is 1, or the like, non-zero class conversion can be implemented.

The class dividing unit 112 supplies the information supplied from the class integrating unit 111 and information representing the division result to the quantization representative value deciding unit 106 (arrow 128).

The quantization representative value deciding unit 106 is the same processing unit as the quantization representative value deciding unit 14 of FIG. 1. The quantization representative value deciding unit 106 obtains a gravity center of a pixel value for each class, and decides the gravity center as a representative value of a corresponding class. Here, the quantization representative value deciding unit 106 decides a representative value of a class based on the information supplied from the class configuring unit 103, the zero class detecting unit 104, or the non-zero class converting unit 105 (the class dividing unit 112).

In the example of FIG. 5B, the quantization representative value deciding unit 106 decides a quantization representative value r on each of a section between the section boundaries $d_{x-1}$ and $d_x$ and a section between the section boundaries $d_x$ and $d_{x-1}$. In the example of FIG. 5B, since the number of pixel samples between the section boundaries $d_{x-1}$ and $d_x$ is 1, the pixel sample becomes a gravity center of a pixel sample in the corresponding section as illustrated in FIG. 5C. That is, a single pixel sample becomes the quantization representative value r. Further, in the example of FIG. 5B, since the number of pixel samples between the section boundaries $d_x$ and $d_{x+1}$ is 2, a medium value of the two pixel samples becomes a gravity center of pixel samples in the corresponding section as illustrated in FIG. 5C. That is, the medium value of the two pixel samples becomes the quantization representative value r.

Further, through this process, an initial value of the representative value of each class may be decided, or at least one of representative values may be updated. In this case, the quantization representative value deciding unit 106 returns the histogram, the information related to the class boundary, the information of a class allocated to each pixel, the information related to the representative value of each class, and the like to the class boundary deciding unit 102 (arrow 129) in order to update the class boundary.

The class boundary deciding unit 102 decides a medium value of two neighboring representative values as a new class boundary based on the information supplied from the quantization representative value deciding unit 106. The class boundary deciding unit 102 decides one class boundary on each of all combinations of two neighboring representative values, that is, decides one class boundary on each of all medium values between neighboring representative values. The class configuring unit 103 sorts all pixel values of the input image on a class updated by the class boundary deciding unit 102 as described above.

Further, when each class is converted into a non-zero class once by the non-zero class converting unit 105, or when a zero class has not been detected by the zero class detecting unit 104, since no zero class is present even though the section boundary is updated, detection of a zero class by the zero class detecting unit 104 or non-zero class conversion by the non-zero class converting unit 105 may not be performed.

In other words, in a process on the updated class, the class configuring unit 103 supplies the above-described various information to the quantization representative value deciding unit 106 (arrow 130).

The quantization representative value deciding unit 106 decides a representative value on a class updated by the class configuring unit 103 in the above-described way. When the representative value has not been updated, the quantization representative value deciding unit 106 supplies the decided representative value of each class to the table generating unit 107 (arrow 131).

Figure 6:
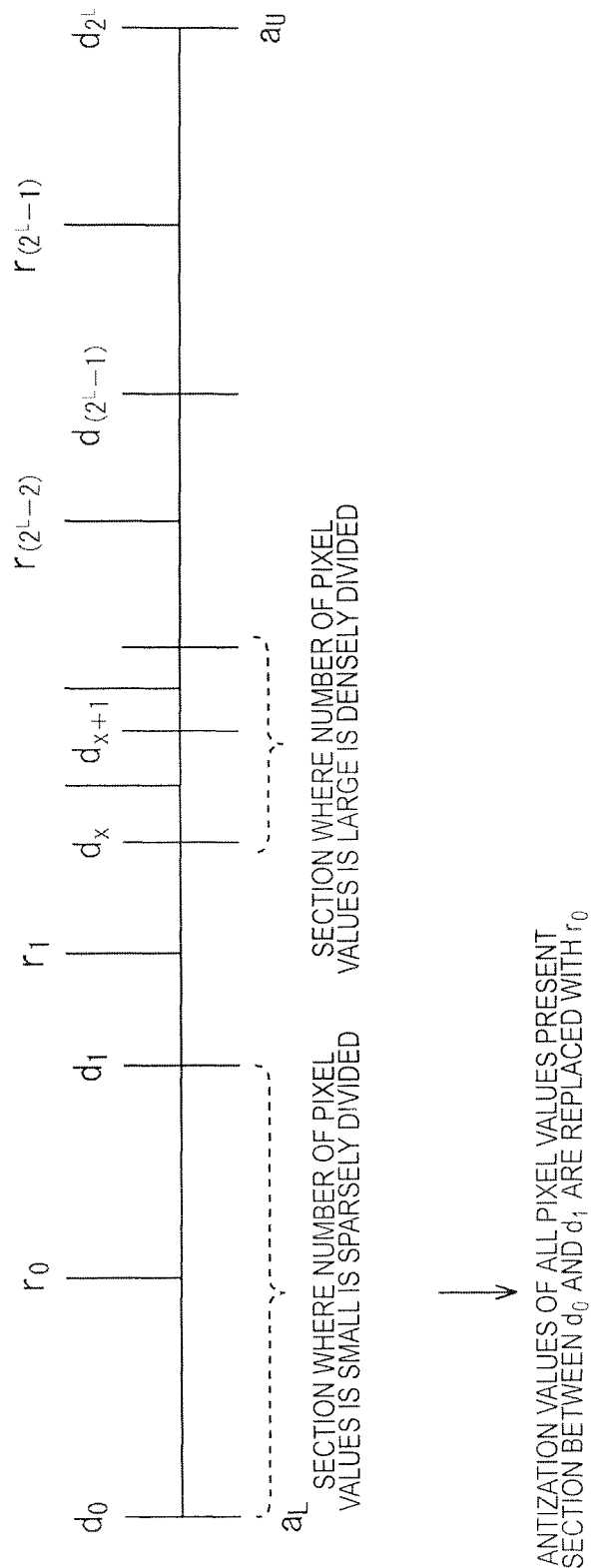
FIG. 6 is a diagram for explaining an example of a relation between a quantization representative value and a boundary value of a class after convergence.

An example of a result into which a representative value is converged by the above loop process is illustrated in FIG. 6. For example, the number of pixel values between $d_0$ and $d_1$ is small, and so a section width is large, that is, a section is sparsely divided. On the other hand, the number of pixel values between $d_x$ and $d_{x+1}$ is large, and so a section width is small, that is, a section is densely divided.

The table generating unit 107 is the same processing unit as the table generating unit 15 of FIG. 1. The table generating unit 107 generates a table in which an index (class number) is allocated to a representative value of each class, supplies the table to the index image generating unit 108, and outputs the table to the outside of the image processing apparatus 100 (arrow 132).

Figure 7:
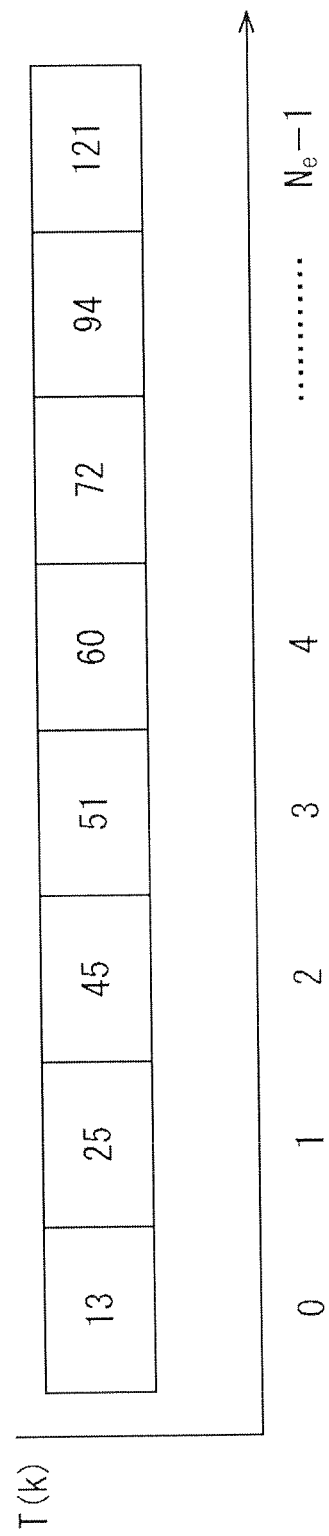
FIG. 7 is a diagram for explaining an example of a table.

FIG. 7 is a diagram illustrating an example of a table generated by the table generating unit 107. As illustrated in FIG. 7, the table generating unit 107 generates a table in which a class number (index) is allocated to each representative value. Here, Ne is a total number of quantized pixel values J(x,y), a number such as 13, 25, and the like in the figure represents an actually quantized pixel value J(x,y). In this way, a table in which converged quantized pixel values are arranged in order is generated.

Further, the quantization representative value deciding unit 106 transforms all pixel values of the input image into representative values of corresponding classes, respectively (that is, quantizes the input image). The quantization representative value deciding unit 106 supplies the representative values (the quantized pixel values) to the index image generating unit 108 (arrow 133).

The index image generating unit 108 is the same processing unit as the index image generating unit 16 of FIG. 1. The index image generating unit 108 transforms each quantized pixel value (that is, the representative value of each class) supplied from the quantization representative value deciding unit 106 into an index (class number) using the table supplied from the table generating unit 107, and then outputs the index (class number) to the outside of the image processing apparatus 100 (arrow 134). In other words, the index image generating unit 108 transforms the quantized image into an index image in which each pixel value is represented by an index by transforming the quantized pixel value (representative value) into the index on each pixel.

Figure 8:
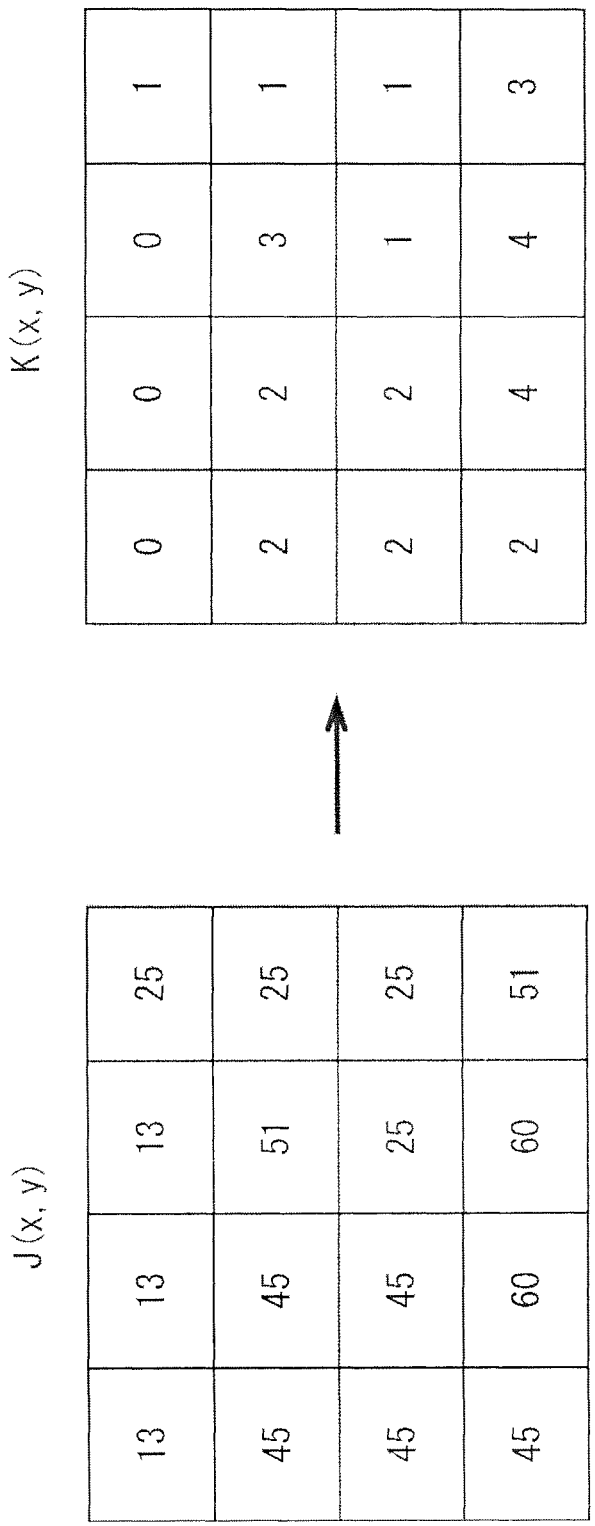
FIG. 8 is a diagram for explaining an example of indexing of a pixel value.

FIG. 8 is a diagram for explaining an example of an aspect of generating an index image by the index image generating unit 108. In the example of FIG. 8, the index image generating unit 108 transforms a quantized pixel value J(x,y) illustrated at the left of FIG. 8 into index number K(x,y), on the table, corresponding to the corresponding pixel value. As can be seen in FIG. 8, an absolute value of K(x,y) is much smaller than J(x,y). Thus, by indexing the quantized pixel value as described above, the image processing apparatus 100 can expect a high compression effect.

As described above, the image processing apparatus 100 can implement non-zero class conversion of all classes without reducing the number of classes. Thus, the image processing apparatus 100 can sufficiently suppress quantization error, even on a sparse image (in which no pixel is present in a class in a quantization section) which does not supply a minimum error in the quantization of the Lloyd-Max technique of the related art, leading to a minimum error.

Further, the table generated by the table generating unit 107 and an information amount of an index image generated by the index image generating unit 108 are much smaller than a data amount of a quantized image. Thus, the image processing apparatus 100 may transmit the index image to a reception side "as is" but may compress an index image using any known compression means and then transmit a compressed image.

[Flow of Quantization Process]

Figure 9:
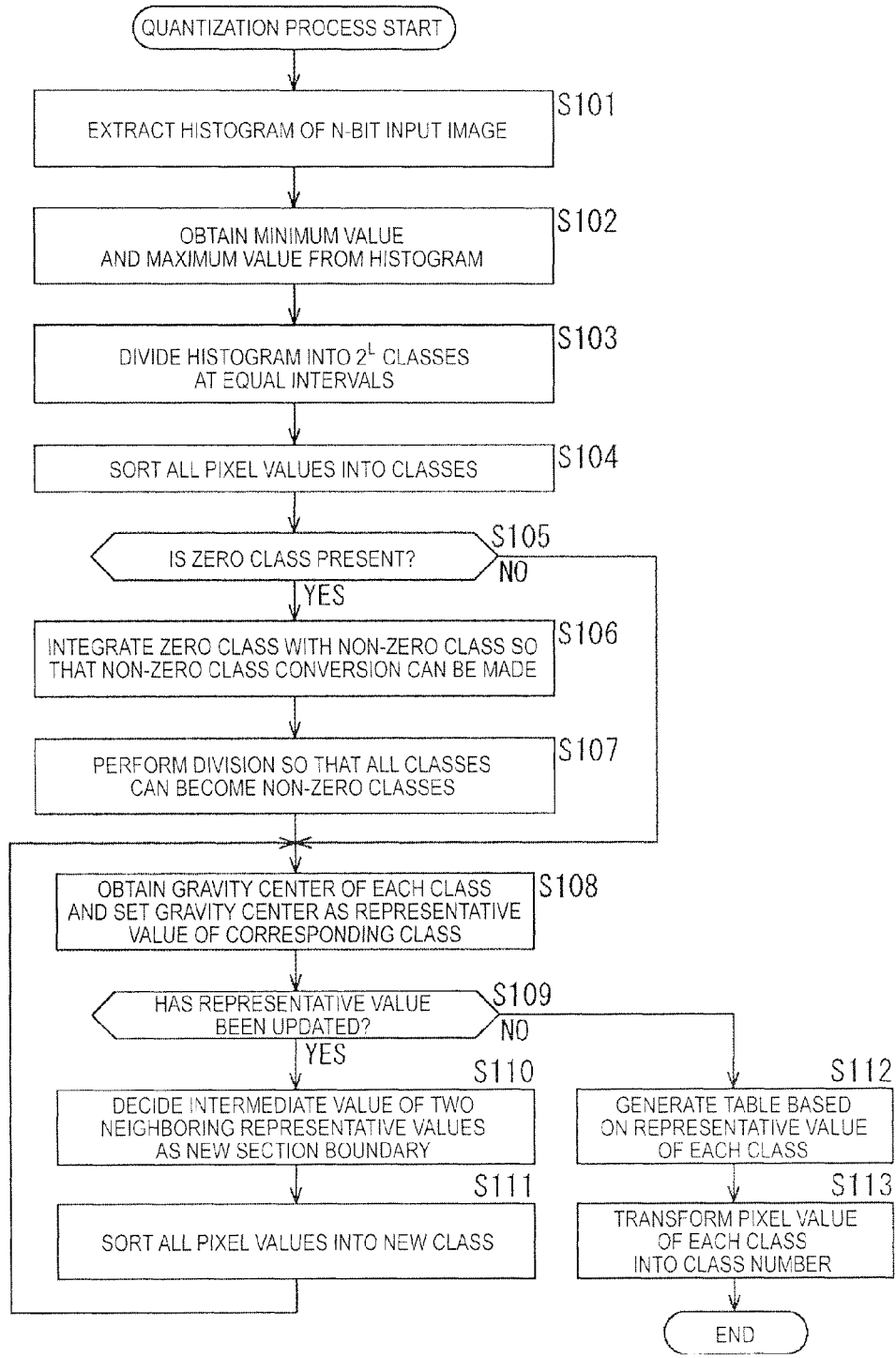
FIG. 9 is a flowchart for explaining an example of a quantization process.

An example of the flow of the quantization process performed by the image processing apparatus 100 will be described with reference to the flowchart of FIG. 9.

When the quantization process starts, in step S101, the histogram generating unit 101 extracts a histogram of an N-bit input image. In step S102, the histogram generating unit 101 obtains a minimum value and a maximum value from the histogram.

In step S103, the class boundary deciding unit 102 divides a range between the maximum value and the minimum value of the histogram into $2^L$ classes at equal intervals. In step S104, the class configuring unit 103 sorts all pixel values of the input image into classes respectively corresponding to values thereof.

In step S105, the zero class detecting unit 104 determines whether or not a zero class in which an appearance frequency of a pixel value is zero is present on the generated class. When it is determined that a class (that is, a zero class) into which a pixel value has not been sorted by the process of step S104 is present, the zero class detecting unit 104 causes the process to proceed to step S106.

In step S106, the class integrating unit 111 of the non-zero class converting unit 105 integrates a zero class with a non-zero class so that non-zero class conversion can be made. More specifically, the class integrating unit 111 integrates neighboring classes as necessary, and integrates consecutive classes so that the number of pixel values corresponding to a corresponding class in each class obtained as a result of integration can be equal to or more than the number of classes integrated for generating the corresponding class.

In step S107, the class dividing unit 112 of the non-zero class converting unit 105 divides the integrated class so that all divided classes can become non-zero classes. In other words, the class dividing unit 112 divides the class integrated by the class integrating unit 111 into the number of classes before integration. At this time, the class dividing unit 112 performs division such that the position of the section boundary is adjusted so that a pixel value can belong to each of all classes.

Through this process, the non-zero class converting unit 105 can convert all classes into non-zero classes without changing the number of classes.

When the process of step S107 ends, the class dividing unit 112 causes the process to proceed to step S108. However, when it is determined in step S105 that no zero class is present, the zero class detecting unit 104 causes the process to proceed to step S108.

In step S108, the quantization representative value deciding unit 106 obtains a gravity center of each class and sets the gravity center as a representative value of a corresponding class. In step S109, the quantization representative value deciding unit 106 determines whether or not the representative value of each class has been updated by the process of step S108. When it is determined that at least one representative value has been updated, the quantization representative value deciding unit 106 causes the process to proceed to step S110.

In step S110, the class boundary deciding unit 102 decides a medium value of two neighboring representative values as a new section boundary. In other words, the class boundary deciding unit 102 updates the section boundary according to the updated representative value. In step S111, the class configuring unit 103 sorts all pixel values of the input image into updated classes respectively corresponding to values thereof. When the process of step S111 ends, the class configuring unit 103 causes the process to return to step S108, and then repeats step S108 and subsequent processes.

In other words, steps S108 to S111 are repeatedly executed until it is determined in step S109 that no representative values have been updated. Meanwhile, when it is determined in step S109 that no representative values have been updated, the quantization representative value deciding unit 106 causes the process to proceed to step S112.

In step S112, the table generating unit 107 generates a table in which a representative value of each class is associated with an index (class number). In step S113, the quantization representative value deciding unit 106 transforms (quantizes) each pixel value of the input image into a representative value of each corresponding class. The index image generating unit 108 transforms the quantized pixel value into the index (class number) using the table generated in step S112.

When the process of step S113 ends, the index image generating unit 108 ends the quantization process.

By performing the process in the above-described way, the image processing apparatus 100 can implement non-zero class conversion of all classes, without reducing the number of classes, even on a sparse image, and can sufficiently suppress quantization error.

3. Third Embodiment

[Image Processing Apparatus that Performs Quantization for Each Block]

The quantization described in the second embodiment may be performed for each of a plurality of blocks divided from a processing target image.

Figure 10:
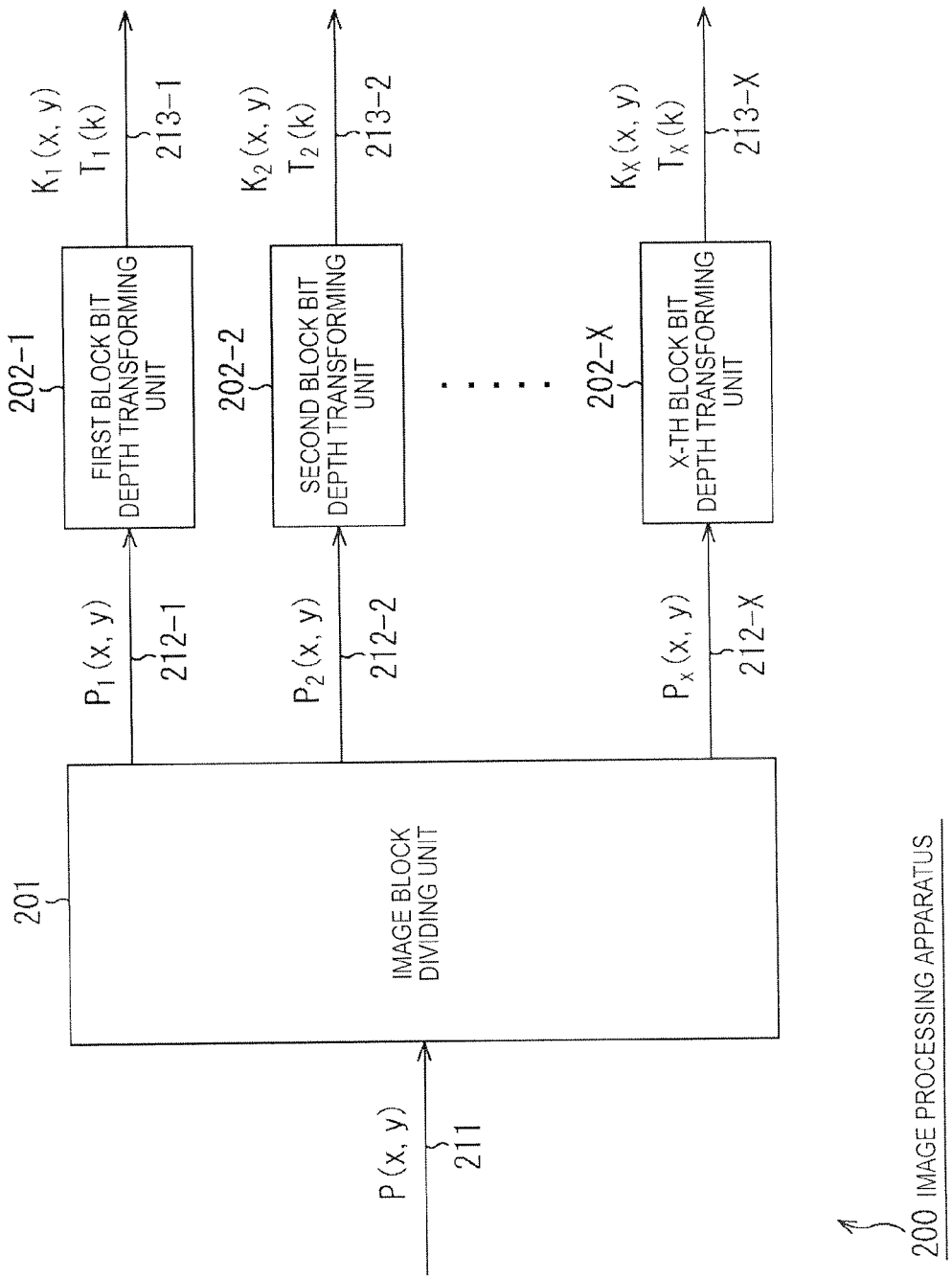
FIG. 10 is a block diagram illustrating another example of a configuration of an image processing apparatus that performs quantization.

FIG. 10 is a block diagram illustrating an example of a main configuration of an image processing apparatus in this case.

An image processing apparatus 200 illustrated in FIG. 10 includes an image block dividing unit 201, and a first block bit depth transforming unit 202-1, a second block bit depth transforming unit 202-2, . . . an X-th block bit depth transforming unit 202-X. In other words, the image processing apparatus 200 includes one image block dividing unit 201 and X bit depth transforming units 202.

The image block dividing unit 201 divides an input image P(x,y) (arrow 211) into a predetermined number (X) of rectangular blocks. The shape of each block is arbitrary. For example, the image block dividing unit 201 may divide the input image into M (horizontal)×N(vertical) (=X) blocks. Further, for example, the image block dividing unit 201 may divide the input image X blocks in a vertical direction like slices. Further, the blocks may not be the same size and shape.

The image block dividing unit 201 supplies an image of each block to the bit depth transforming unit 202 corresponding to each block. For example, the image block dividing unit 201 supplies an image $P_1(x,y)$ of a first block to the first block bit depth transforming unit 202-1 (arrow 212-1). Further, for example, the image block dividing unit 201 supplies an image $P_2(x,y)$ of a second block to the second block bit depth transforming unit 202-2 (arrow 212-2). Further, for example, the image block dividing unit 201 supplies an image $P_x(x,y)$ of an X-th block to the X-th block bit depth transforming unit 202-X (arrow 212-X).

The bit depth transforming unit 202 is a processing unit that independently performs the same quantization process as the image processing apparatus 100 on the image of each block.

In other words, the first block bit depth transforming unit 202-1 has the same configuration as the image processing apparatus 100, performs the same process as in the image processing apparatus 100 on the image $P_1(x,y)$ of the first block, performs non-zero class conversion of all classes without reducing the number of classes, generates a table $T_1(k)$ and an index image $K_1(x,y)$, and outputs the table $T_1(k)$ and the index image $K_1(x,y)$ to the outside of the image processing apparatus 200 (arrow 213-1).

Further, the second block bit depth transforming unit 202-2 has the same configuration as the image processing apparatus 100, performs the same process as in the image processing apparatus 100 on the image $P_2(x,y)$ of the second block, performs non-zero class conversion of all classes without reducing the number of classes, generates a table $T_2(k)$ and an index image $K_2(x,y)$, and outputs the table $T_2(k)$ and the index image $K_2(x,y)$ to the outside of the image processing apparatus 200 (arrow 213-2).

Further, the bit depth transforming unit 202 corresponding to each block performs the same process even on other blocks. Further, the X-th block bit depth transforming unit 202-X has the same configuration as the image processing apparatus 100, performs the same process as in the image processing apparatus 100 on the image $P_x(x,y)$ of the X-th block, performs non-zero class conversion of all classes without reducing the number of classes, generates a table $T_x(k)$ and an index image $K_x(x,y)$, and outputs the table $T_x(k)$ and the index image $K_x(x,y)$ to the outside of the image processing apparatus 200 (arrow 213-X).

The first block bit depth transforming unit 202-1 to the X-th block bit depth transforming unit 202-X can perform the process independently from each other. In other words, some or all of the first block bit depth transforming unit 202-1 to the X-th block bit depth transforming unit 202-X may perform the process in parallel (may perform the process on a plurality of blocks in parallel) or may perform the process at different timings.

An image of each block is smaller in a total number of pixel values than the whole image and so is high sparsity. Thus, a quantization error occurring when an image of each block is quantized and then inversely quantized is reduced compared to when the same process is performed on the whole image.

Further, by executing the quantization on blocks in parallel, a processing time can be reduced.

Here, when quantization/inverse quantization (bit transform) is performed on the whole image, the number of necessary tables is reduced, and so an information amount can be reduced correspondingly.

Further, since the size and shape of each block is arbitrary as described above, the image block dividing unit 201 may perform block division such that the sparsity increases according to the content of the input image.

[Flow of Quantization Process]

Figure 11:
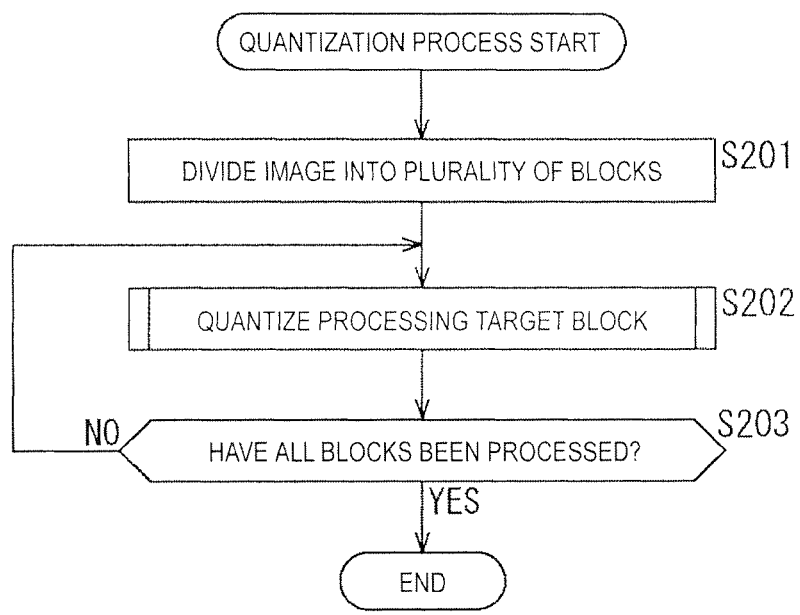
FIG. 11 is a flowchart for explaining another example of a quantization process.

An example of a quantization process executed by the image processing apparatus 200 will be described with reference to the flowchart of FIG. 11.

When the quantization process starts, in step S201, the image block dividing unit 201 divides an input image into a plurality of blocks.

In step S202, the bit depth transforming unit 202 (the first block bit depth transforming unit 202-1 to the X-th block bit depth transforming unit 202-X) quantizes a processing target block similarly to the case described with reference to the flowchart of FIG. 9.

In step S203, the bit depth transforming unit 202 (the first block bit depth transforming unit 202-1 to the X-th block bit depth transforming unit 202-X) determines whether or not all blocks have been quantized. When it is determined that a non-processed block is present, the bit depth transforming unit 202 causes the process to return to step S202. The bit depth transforming unit 202 corresponding to the non-processed block performs the quantization process on the non-processed block.

When it is determined in step S203 that all blocks generated in step S201 have been quantized, the bit depth transforming unit 202 ends the quantization process.

By performing the process in the above-described way, the image processing apparatus 200 can further reduce quantization error.

4. Fourth Embodiment

[Image Processing Apparatus that Performs Inverse Quantization]

Next, an inverse quantization process corresponding to the quantization process described in the second embodiment will be described.

Figure 12:
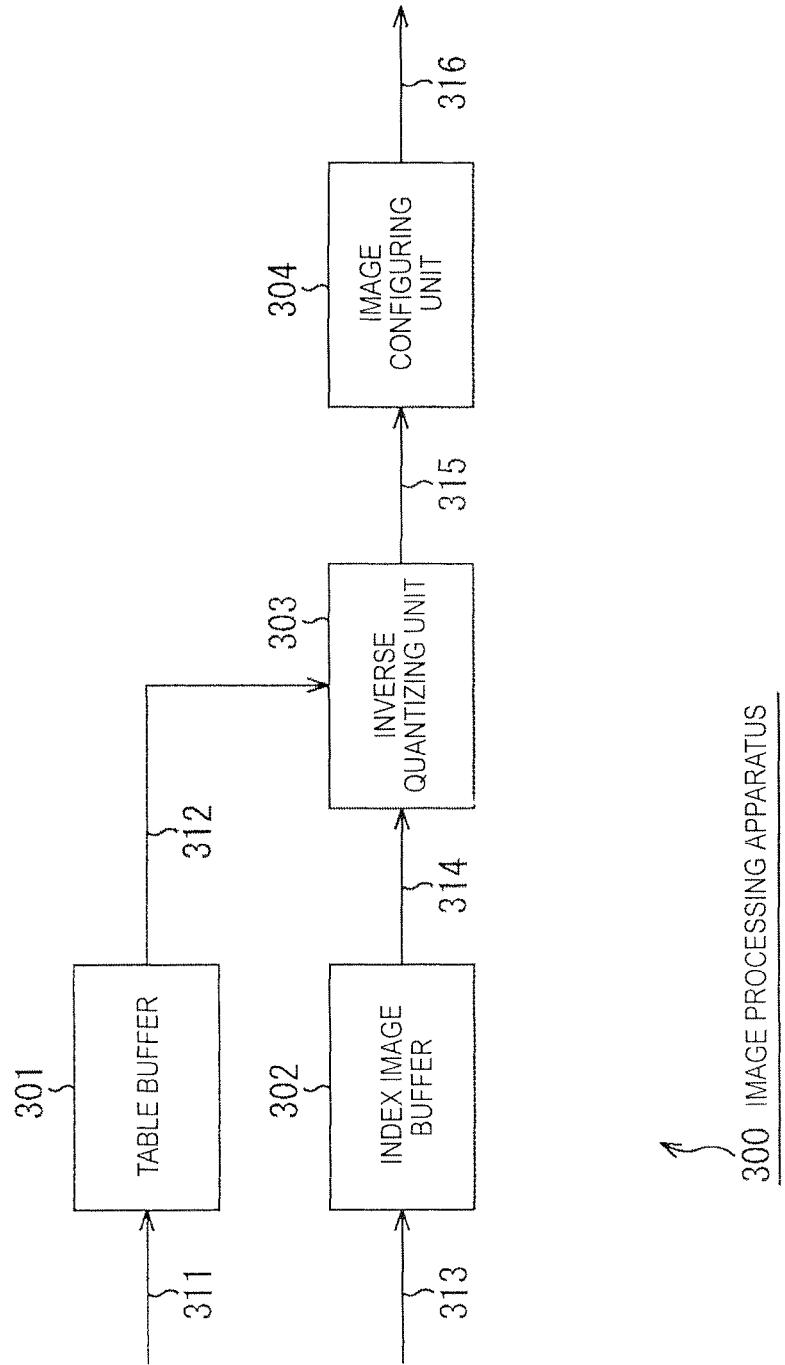
FIG. 12 is a block diagram illustrating an example of a main configuration of an image processing apparatus that performs inverse quantization.

FIG. 12 is a block diagram illustrating an example of a main configuration of an image processing apparatus that performs inverse quantization. The image processing apparatus 300 illustrated in FIG. 12 performs inverse quantization corresponding to quantization of the image processing apparatus 100 described in the second embodiment.

As illustrated in FIG. 12, the image processing apparatus 300 includes a table buffer 301, an index image buffer 302, an inverse quantizing unit 303, and an image configuring unit 304.

The table buffer 301 acquires the table, in which an index (class number) is allocated to a representative value of each class, generated by the table generating unit 107 of the image processing apparatus 100 (arrow 311), and then stores the table. The table buffer 301 supplies the stored table to the inverse quantizing unit 303 at a predetermined timing or according to external instructions from the inverse quantizing unit 303 or the like (arrow 312).

The index image buffer 302 acquires the index image generated by the index image generating unit 108 of the image processing apparatus 100 (arrow 313), and then stores the table. The index image buffer 302 supplies the stored index image to the inverse quantizing unit 303 at a predetermined timing or according to external instructions from the inverse quantizing unit 303 or the like (arrow 314).

The inverse quantizing unit 303 performs inverse quantization on the index image acquired from the index image buffer 302 using the table acquired from the table buffer 301. More specifically, the inverse quantizing unit 303 transforms each pixel value of an index image, i.e., an index, into a representative value of a class represented by the index.

For example, let us assume that the table generating unit 107 of the image processing apparatus 100 has generated the table illustrated in FIG. 7, and the index image generating unit 108 of the image processing apparatus 100 has generated the index image K(x,y) illustrated in FIG. 8.

Figure 13:
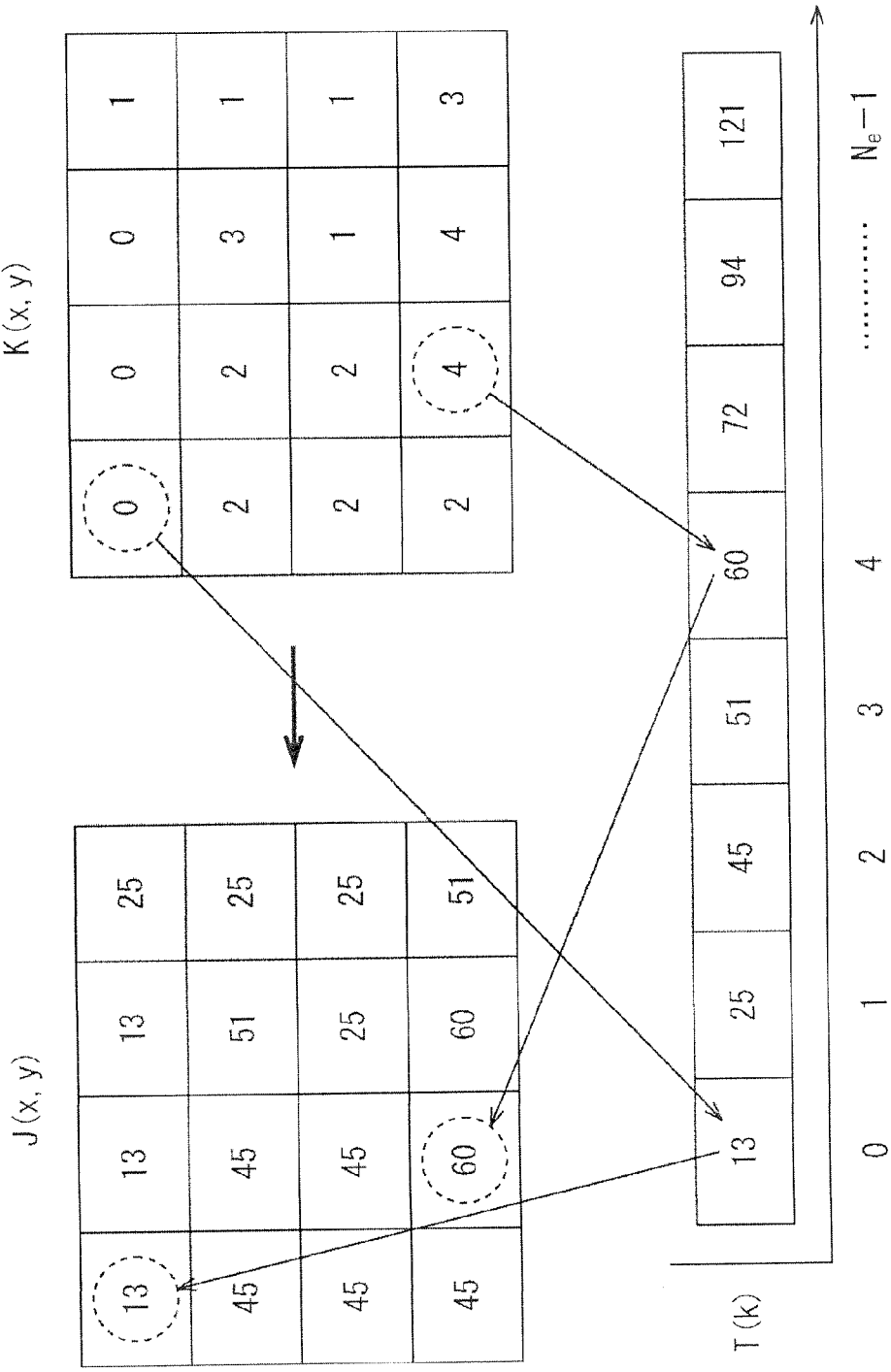
FIG. 13 is a diagram for explaining an example of inverse quantization.

In this case, the inverse quantizing unit 303 performs a reverse lookup operation and transforms the index into a representative value of a corresponding class as illustrated in FIG. 13. For example, an index "0" in an index image K(x,y) illustrated on the right in FIG. 13 corresponds to a representative value "13" in a table T(k) illustrated on the lower side of FIG. 13. Thus, the inverse quantizing unit 303 transforms the index "0" into the value "13." Further, for example, the inverse quantizing unit 303 transforms an index "4" into a value "60" in a similar manner.

The inverse quantizing unit 303 supplies each transformed pixel value (that is, a representative value of a corresponding class) J(x,y) to the image configuring unit 304 as an N-bit pixel value (arrow 315).

The image configuring unit 304 stores each pixel value supplied from the inverse quantizing unit 303 as a pixel value of an inversely quantized image. The image configuring unit 304 outputs each stored pixel value to the outside of the image processing apparatus 300, at a predetermined timing or according to external instructions, as a pixel value of an inversely quantized image (arrow 316).

In this way, the image processing apparatus 300 can properly inversely quantize the index image generated by the image processing apparatus 100. Thus, the image processing apparatus 300 can suppress quantization error, even on a sparse image which does not supply a minimum error in the quantization of the Lloyd-Max technique of the related art.

[Flow of Inverse Quantization Process]

Figure 14:
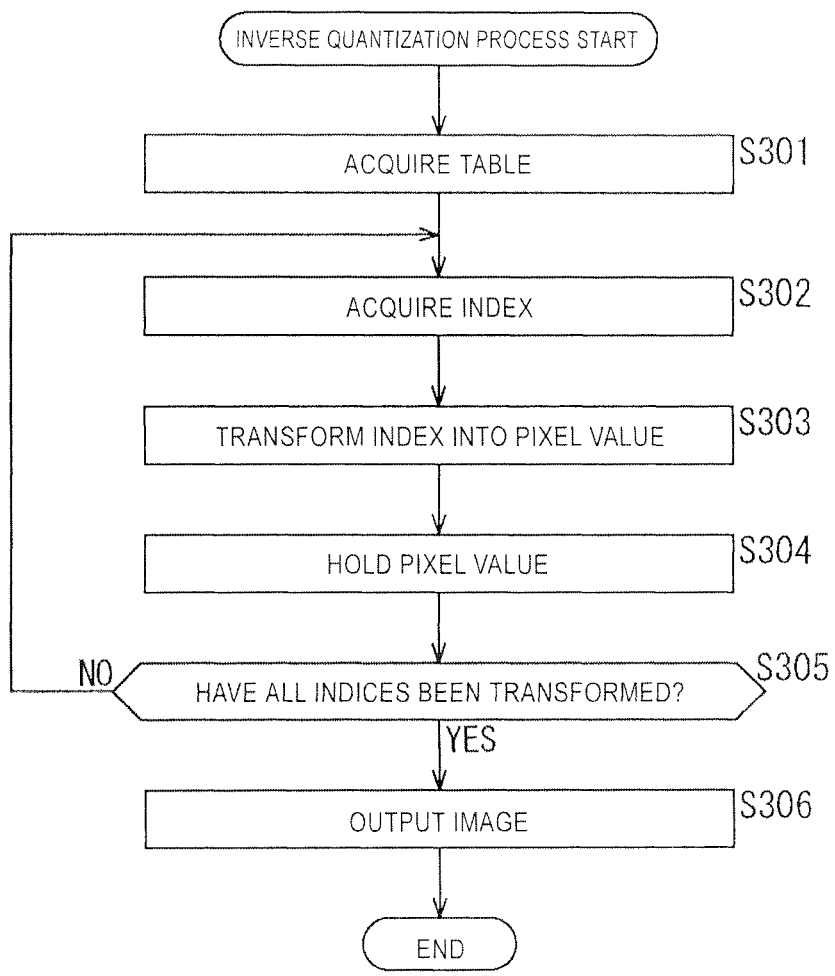
FIG. 14 is a flowchart for explaining an example of an inverse quantization process.

Next, an example of an inverse quantization process executed by the image processing apparatus 300 will be described with reference to the flowchart of FIG. 14.

When the inverse quantization process starts, in step S301, the table buffer 301 acquires the table, in which a representative value of each class is associated with an index (class number), input to the image processing apparatus 300.

In step S302, the index image buffer 302 acquires one index of an index image input to the image processing apparatus 300. In step S303, the inverse quantizing unit 303 performs inverse quantization on the index acquired in step S302 using the table acquired in step S301 and transforms the index into a pixel value (a representative value of a class). In step S304, the image configuring unit 304 stores (holds) the pixel value acquired by the process of step S303.

In step S305, the inverse quantizing unit 303 determines whether or not all indices have been transformed into pixel values. When it is determined that a non-processed index is present, the process returns to step S302, and step S302 and subsequent processes are repeated. The processes of steps S302 to S305 are performed on each index, and when it is determined in step S305 that all indices included in an index image of a processing target have been processed, the inverse quantizing unit 303 causes the process to proceed to step S306.

In step S306, the image configuring unit 304 outputs the stored pixel value (an image corresponding to the index image). When the image is output, the image configuring unit 304 ends the inverse quantization process.

By performing the process in the above-described way, the image processing apparatus 300 can suppress quantization error, even on a sparse image.

5. Fifth Embodiment

[Image Processing Apparatus that Performs Inverse Quantization for Each Block]

The inverse quantization described in the fourth embodiment may be performed for each of a plurality of blocks divided from a processing target image, similarly to the case of quantization.

Figure 15:
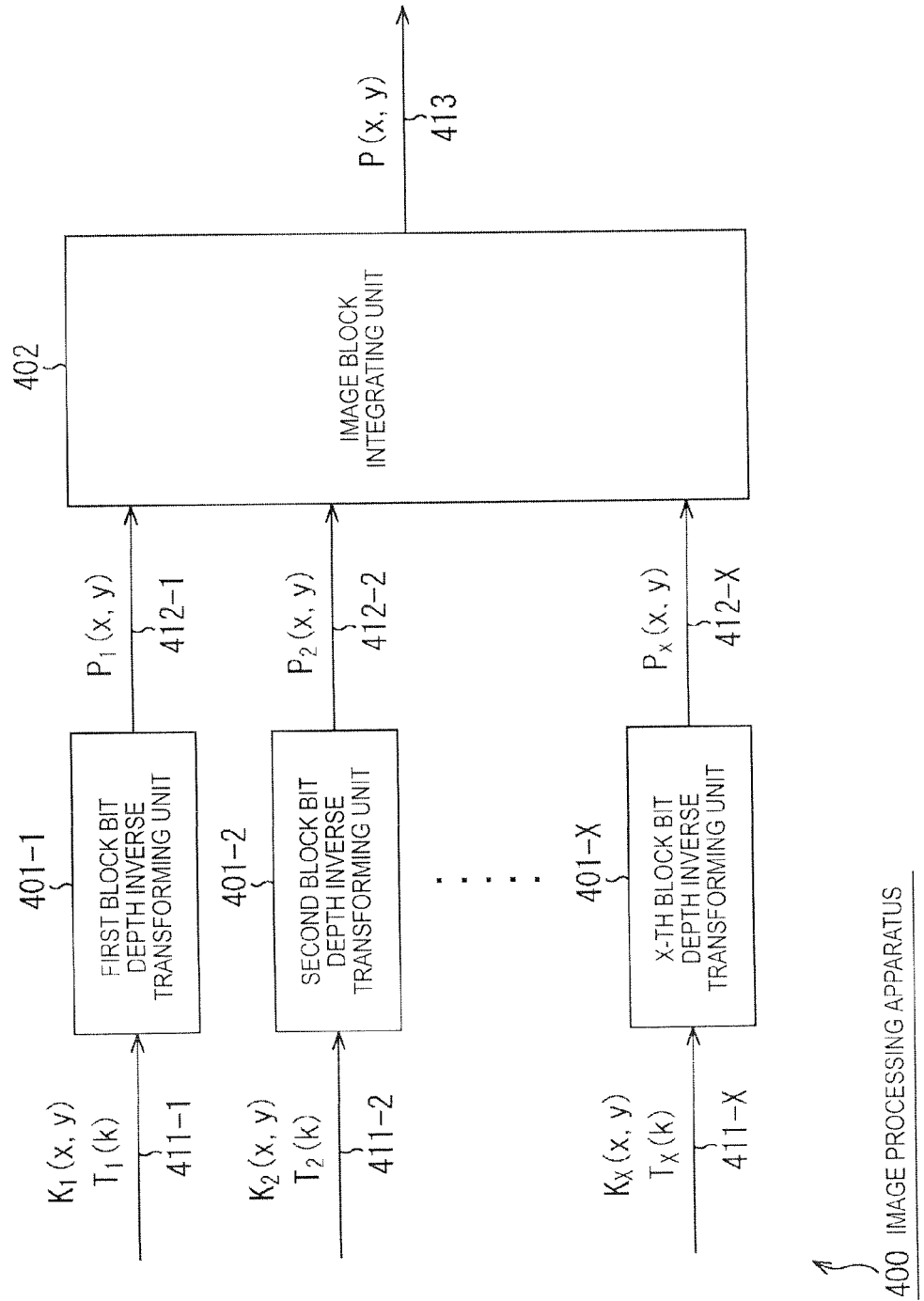
FIG. 15 is a block diagram illustrating another example of a configuration of an image processing apparatus that performs inverse quantization.

FIG. 15 is a block diagram illustrating an example of a main configuration of an image processing apparatus in this case.

An image processing apparatus 400 illustrated in FIG. 15 includes a first block bit depth inverse transforming unit 401-1, a second block bit depth inverse transforming unit 401-2, ... X-th block bit depth inverse transforming unit 401-X, and an image block integrating unit 402. In other words, the image processing apparatus 200 includes X bit depth inverse transforming units 401 respectively corresponding to different blocks and one image block integrating unit 402 that integrates X blocks into one image.

The image processing apparatus 400 corresponds to the image processing apparatus 200, and inversely quantizes an image quantized by the image processing apparatus 200. In other words, the image processing apparatus 400 acquires X tables and X index images which are generated as an image is quantized in units of blocks in the image processing apparatus 200.

The first block bit depth inverse transforming unit 401-1 corresponds to the first block bit depth transforming unit 202-1. The first block bit depth inverse transforming unit 401-1 inversely quantizes an input index $K_1(x,y)$ (arrow 411-1) of a first block using an input table $T_1(k)$ (arrow 411-1) of the first block. The first block bit depth inverse transforming unit 401-1 supplies an image $P_1(x,y)$ of the first block generated by the inverse quantization to the image block integrating unit 402 (arrow 412-1).

The second block bit depth inverse transforming unit 401-2 corresponds to the second block bit depth transforming unit 202-2. The second block bit depth inverse transforming unit 401-2 inversely quantizes an input index $K_2(x,y)$ (arrow 411-2) of a second block using an input table $T_2(k)$ (arrow 411-2) of the second block. The second block bit depth inverse transforming unit 401-2 supplies an image $P_x(x,y)$ of the second block generated by the inverse quantization to the image block integrating unit 402 (arrow 412-2).

The remaining blocks including a third block are processed in a similar manner. The X-th block bit depth inverse transforming unit 401-X corresponds to the X-th block bit depth transforming unit 202-X. The X-th block bit depth inverse transforming unit 401-X inversely quantizes an input index $K_X(x,y)$ (arrow 411-X) of an X-th block using an input table $T_X(k)$ (arrow 411-X) of the X-th block. The X-th block bit depth inverse transforming unit 401-X supplies an image $P_X(x,y)$ of the X th block generated by the inverse quantization to the image block integrating unit 402 (arrow 412-X).

The image block integrating unit 402 generates one image $P(x,y)$ by integrating images of blocks supplied from the bit depth inverse transforming units 401, and outputs the image P(x,y) to the outside of the image processing apparatus 400 (arrow 413).

Even in the case of the inverse quantization, an image of each block is higher in sparsity than the whole image. Thus, a quantization error occurring when an image of each block is quantized and then inversely quantized is reduced compared to when the same process is performed on the whole image. Further, by executing inverse quantization on blocks in parallel, a processing time can be reduced.

Here, when the quantization/inverse quantization (bit transform) process is performed on the whole image, the number of necessary tables is reduced, and so an information amount can be reduced correspondingly.

Further, the size and shape of each block is arbitrary as described above. Further, the process of each bit depth inverse transforming unit 401 may be independently performed, may be executed in parallel with the process of another block, or may be performed at a timing different from the process of another block.

[Flow of Inverse Quantization Process]

Figure 16:
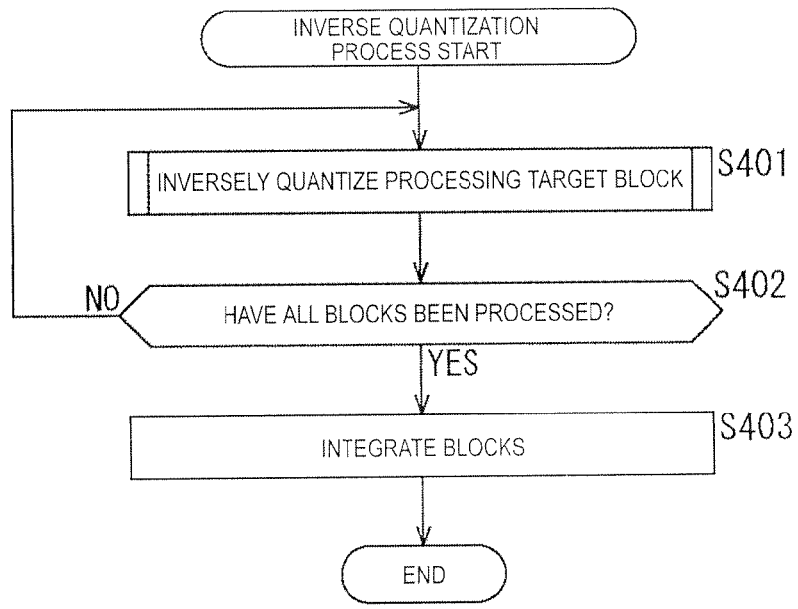
FIG. 16 is a flowchart for explaining another example of an inverse quantization process.

An example of the flow of the inverse quantization process executed by the image processing apparatus 400 will be described with reference to the flowchart of FIG. 16.

When the inverse quantization process starts, in step S401, the bit depth inverse transforming unit 401 (the first block bit depth inverse transforming unit 401-1 to the X-th block bit depth inverse transforming unit 401-X) performs each process similarly to the example described with reference to the flowchart of FIG. 14, and inversely quantizes an index image of a processing target block.

In step S402, the bit depth inverse transforming unit 401 (the First block bit depth inverse transforming unit 401-1 to the X-th block bit depth inverse transforming unit 401-X) determines whether or not all blocks have been inversely quantized. When it is determined that a non-processed block is present, the bit depth inverse transforming unit 401 causes the process to return to step S401. The bit depth inverse transforming unit 401 corresponding to the non-processed block performs the inverse quantization process on the non-processed block.

When it is determined in step S402 that all blocks have been inversely quantized, the bit depth inverse transforming unit 401 causes the process to proceed to step S403.

In step S403, the image block integrating unit 402 integrates the blocks inversely quantized in step S401 and generates one inversely quantized image. When the process of step S403 ends, the image block integrating unit 402 ends the inverse quantization process.

By performing the process in the above-described way, the image processing apparatus 400 can further reduce quantization error.

[Example of Evaluation Result]

Figure 17:
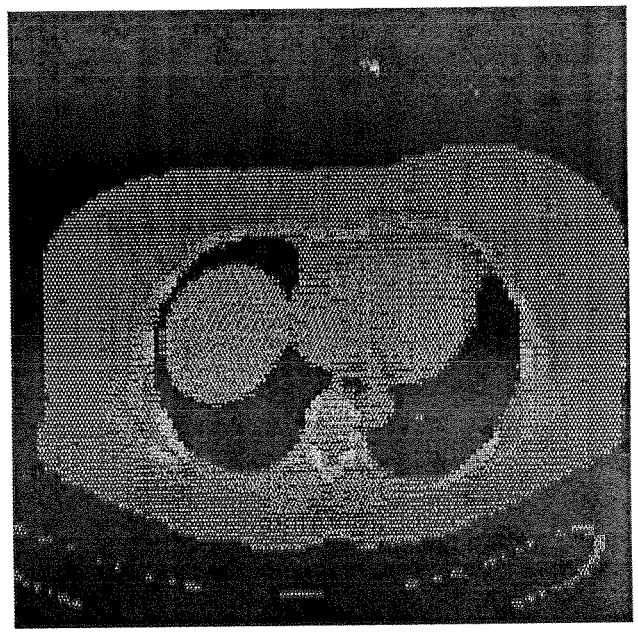
FIG. 17 is a diagram for explaining an example of a medical image of a 12-bit depth.

Next, an example of an evaluation result of the above-described quantization process and inverse quantization process will be described. A medical image of a 12-bit depth illustrated in FIG. 17 is used as a processing target of quantization/inverse quantization. The resolution is 512 pixels in a horizontal direction and 512 pixels in a vertical direction.

A value (a peak signal-to-noise ratio (PSNR)) obtained by comparing an image obtained by quantizing an original image (N=12 bits) into L bits and then inversely quantizing the quantized image into N bits with the original image is used as an evaluation value. As the PSNR increases, deterioration is kept small. Further, four cases in which L is 8 to 11 are evaluated.

FIG. 18 is a view illustrating a comparison result obtained by comparing evaluation values of four quantization/inverse quantization methods, that is, "rounding down" in which a least significant bit is rounded down, "rounding off" in which a least significant is rounded off, "Lloyd-Max technique" described in the first embodiment, and "present technique" described in the second embodiment and the fourth embodiment.

As a result of measuring a histogram of an image of FIG. 17, the number Ne of pixels in which an appearance frequency is not zero was 1,835. Since $2^{11}$=2,048 and $2^{10}$=1,024, the image can be quantized and inversely quantized when L is 11 bits. Thus, as illustrated in a table of FIG. 18, in the present technique, when L is 11, the PSNR becomes infinite ($\infty$). Thus, the present technique yields a higher PSNR than the other three techniques.

As illustrated in the table of FIG. 18, even when L is other values, the present technique yields a higher PSNR (smaller in deterioration) than the other three techniques. For example, an improvement effect of 16.5 dB to 24.5 dB compared to a simple rounding off technique is obtained. Further, for example, an improvement effect of 5 dB to 9 dB compared to the Lloyd-Max technique.

Next, evaluation results when block division is made as described in the third embodiment and the fifth embodiment are illustrated in FIGS. 19 to 21. A table illustrated in FIG. 19 is obtained by comparing evaluation results of the above-described four techniques when the number of divided blocks is 4 (2 in a horizontal direction and 2 in a vertical direction). In this case, the present technique obtains an improvement effect of 0.59 dB to 1.06 dB compared to the present technique of the example of FIG. 18 in which block division is not made.

A table illustrated in FIG. 20 is obtained by comparing evaluation results of the above-described four techniques when the number of divided blocks is 16 (6 in a horizontal direction and 6 in a vertical direction). In this case, the present technique obtains an improvement effect of 2.44 dB to 5.53 dB compared to the present technique of the example of FIG. 18 in which block division is not made.

A table illustrated in FIG. 21 is obtained by comparing evaluation results of the above-described four techniques when the number of divided blocks is 100 (10 in a horizontal direction and 10 in a vertical direction). In this case, the present technique obtains an improvement effect of 6.76 dB to 11.18 dB compared to the present technique of the example of FIG. 18 in which block division is not made. Further, even when L is 10 bits, reversible quantization and inverse quantization can be performed.

As described above, using the present technique, the quantization error caused by the quantization/inverse quantization can be further reduced, and so the quantization/inverse quantization (bit transform) can be performed to obtain a high-quality image.

6. Sixth Embodiment

[Image Processing Apparatus that Generates Table Corresponding to Plurality of Frames]

The above description concerns examples in which the quantization is performed such that a histogram is generated, classification is performed, non-zero class conversion is performed when a zero class is present, a representative value of each class is decided, a table is generated in which the representative value of each class is associated with an index (class number), and an index image is generated based on the table. The quantization/inverse quantization may be performed in real time (instantaneously) on frames of a moving image without reducing a reproduction frame rate. In this case (when a real-time operation according to a reproduction frame rate is necessary), since a load is large, high-speed hardware or a high-speed processor is necessary, and so a cost is likely to increase.

Further, in applications such as an image archive or digital cinema encoding, a real-time operation is not absolutely necessary, and it is important to further increase image quality. In this case, the quantization process or the inverse quantization process may not be performed in real time. For example, the image processing apparatus may generate a table on each frame in advance and generate an index image in real time using the table. Thus, since the process performed in real time is reduced to the process of transforming a representative value into an index, a real-time operation can be easily implemented (the cost can be reduced).

Further, in this case, the table can be generated in units of frames, but one table may be generated for two or more frames. In this way, the process for generating the table can be facilitated, and since the number of tables is reduced, a data amount can be reduced.

Figure 22:
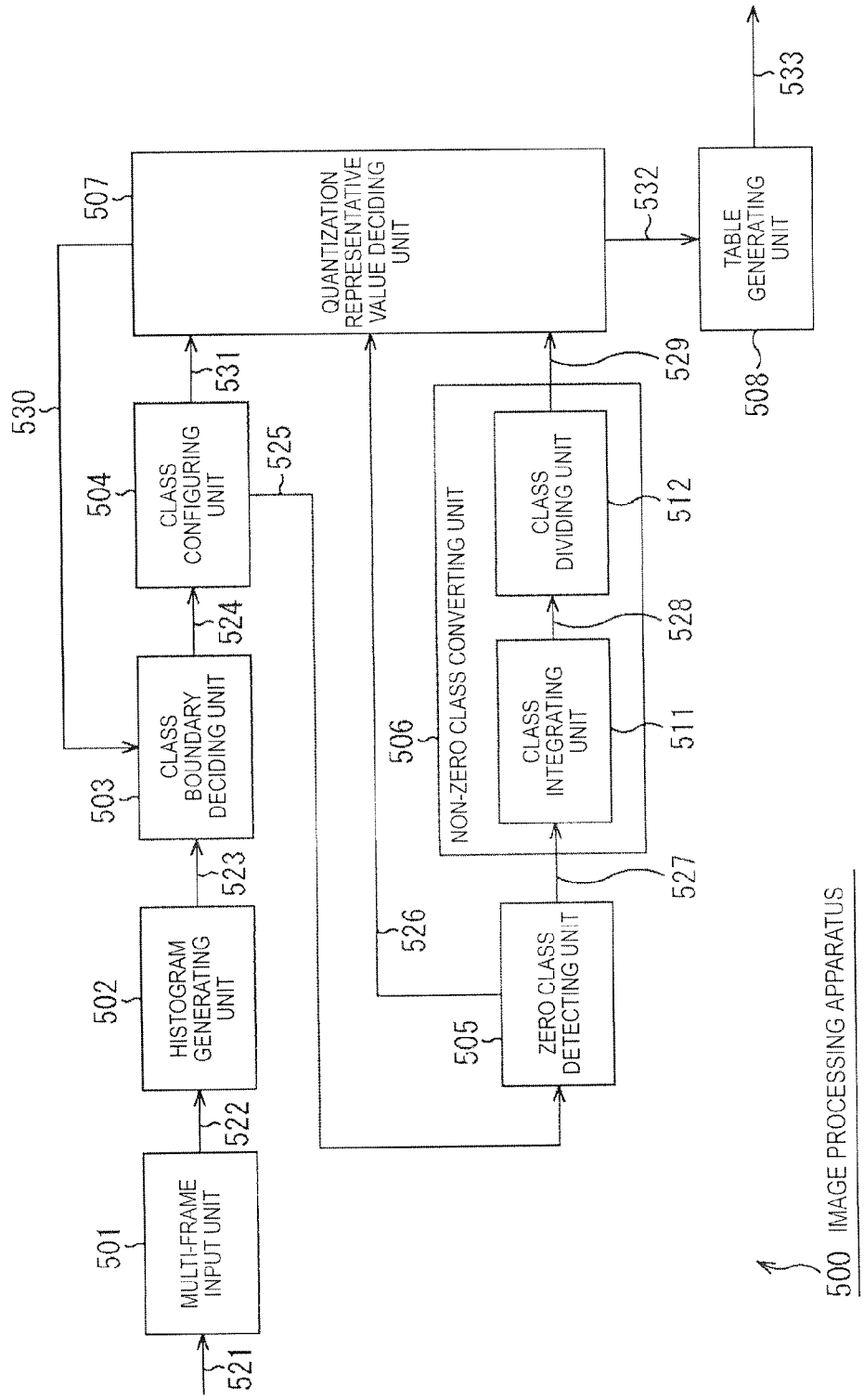
FIG. 22 is a block diagram illustrating an example of a main configuration of an image processing apparatus that generates a table for quantization and inverse quantization.

FIG. 22 is a block diagram illustrating an example of a main configuration of an image processing apparatus that generates a table in this case. The image processing apparatus 500 illustrated in FIG. 22 generates a table, in which a representative value of each class is associated with an index(class number), necessary for a process for generating an index image (a process for transforming a representative value of each pixel into an index) before the generation of the index image.

As illustrated in FIG. 22, the image processing apparatus 500 includes a multi-frame input unit 501, a histogram generating unit 502, a class boundary deciding unit 503, a class configuring unit 504, a zero class detecting unit 505, a non-zero class converting unit 506, a quantization representative value deciding unit 507, and a table generating unit 508. The non-zero class converting unit 506 includes a class integrating unit 511 and a class dividing unit 512.

The multi-frame input unit 501 holds each frame image (arrow 521) of an input moving image, and supplies all pixel values to the histogram generating unit 502 in a predetermined order for every predetermined number of frames (arrow 522).

The histogram generating unit 502, the class boundary deciding unit 503, and the class configuring unit 504 have the same configurations as and perform the same process as the histogram generating unit 101, the class boundary deciding unit 102, and the class configuring unit 103 of FIG. 4, respectively. Further, the zero class detecting unit 505, the non-zero class converting unit 506, the quantization representative value deciding unit 507, and the table generating unit 508 have the same configurations as and perform the same process as the zero class detecting unit 104, the non-zero class converting unit 105, the quantization representative value deciding unit 106, and the table generating unit 107 of FIG. 4, respectively. Further, the class integrating unit 511 and the class dividing unit 512 have the same configurations as and perform the same process as the class integrating unit 111 and the class dividing unit 112 of FIG. 4.

Here, the histogram generating unit 502, the class boundary deciding unit 503, the class configuring unit 504, the zero class detecting unit 505, the non-zero class converting unit 506, the quantization representative value deciding unit 507, and the table generating unit 508 perform corresponding processes using a processing unit as two or more frames.

In other words, the histogram generating unit 502 generates a histogram of all pixel values of a plurality of frame images (arrow 522), obtains a maximum value and a minimum value of a pixel value, and supplies the maximum value and the minimum value to the class boundary deciding unit 503 (arrow 523).

The class boundary deciding unit 503 decides a class boundary for dividing a range between the maximum value and the minimum value of the histogram, which corresponds to a plurality of frame images, supplied from the histogram generating unit 502 into $2^L$ classes at equal intervals, and supplies the histogram and information of the class boundary to the class configuring unit 504 (arrow 524).

The class configuring unit 504 sorts all pixel values of a plurality frame images into classes respectively corresponding to values thereof. The class configuring unit 504 first supplies the histogram, the information related to the class boundary, the information of a class allocated to each pixel, and the like to the zero class detecting unit 505 (arrow 525). Then, when it is ensured that a zero class is not present through the process of the zero class detecting unit 505 or the non-zero class converting unit 506, the class configuring unit 504 supplies a variety of information to the quantization representative value deciding unit 507 (arrow 531).

The zero class detecting unit 505 detects a class (zero class) in which an appearance frequency of a pixel value is zero (0), based on the information supplied from the class configuring unit 504. When no zero class has been detected, the zero class detecting unit 505 supplies a variety of information supplied from the class configuring unit 504 and the detection result to the quantization representative value deciding unit 507 (arrow 526). However, when a zero class has been detected, the zero class detecting unit 505 supplies a variety of information supplied from the class configuring unit 504 and the detection result to the class integrating unit 511 of the non-zero class converting unit 506 (arrow 527).

The non-zero class converting unit 506 converts the zero class detected by the zero class detecting unit 505 into a non-zero class. The class integrating unit 511 integrates the zero class into a neighboring non-zero class based on the information supplied from the zero class detecting unit 505. The class integrating unit 511 supplies the information supplied from the zero class detecting unit 505 and information representing the integration result to the class dividing unit 512 (arrow 528).

The class dividing unit 512 decides a class boundary that causes all classes, integrated by the class integrating unit 511, to be non-zero classes based on the information supplied from the class integrating unit 511, and then performs class division. The class dividing unit 512 supplies the information supplied from the class integrating unit 511 and information representing the division result to the quantization representative value deciding unit 507 (arrow 529).

The quantization representative value deciding unit 507 obtains a gravity center of a pixel value for each class, and decides the gravity center as a representative value of a corresponding class. When an initial value of the representative value of each class is decided or at least one of representative values is updated, the quantization representative value deciding unit 507 returns the histogram, the information related to the class boundary, the information of a class allocated to each pixel, the information related to the representative value of each class, and the like to the class boundary deciding unit 503 (arrow 530) in order to update the class boundary.

The class boundary deciding unit 503 decides an intermediate value of two neighboring representative values as a class boundary. The class configuring unit 504 sorts all pixel values of a plurality of frame images on a class updated by the class boundary deciding unit 503 as described above. In the case of the process on the updated class, the class configuring unit 504 supplies a variety of information to the quantization representative value deciding unit 507 (arrow 531).

The quantization representative value deciding unit 507 decides the representative value on the class updated by the class configuring unit 504 in the above-described way. When the representative value has not been updated, the quantization representative value deciding unit 507 supplies the information related to the class (the section boundary or the like) and the decided representative value of each class to the table generating unit 508 (arrow 532).

The table generating unit 508 defines each class (a section boundary or a representative value), generates a table in which an index (class number) is allocated to a representative value of each class, and outputs the table to the outside of the image processing apparatus 500 (arrow 533).

In other words, the table is generated by performing basically the same process as in the image processing apparatus 100 of FIG. 4 except that the processing target is pixel values of a plurality of frame images other than pixel values of one image, the index image is not generated at that point in time, and so information related to a class is included in the table.

Accordingly, the image processing apparatus 500 can implement non-zero class conversion of all classes without reducing the number of classes. Further, the image processing apparatus 500 can sufficiently suppress quantization error even on a sparse image which does not supply a minimum error in the quantization of the Lloyd-Max technique of the related art, leading to a minimum error.

[Flow of Quantization Process]

Figure 23:
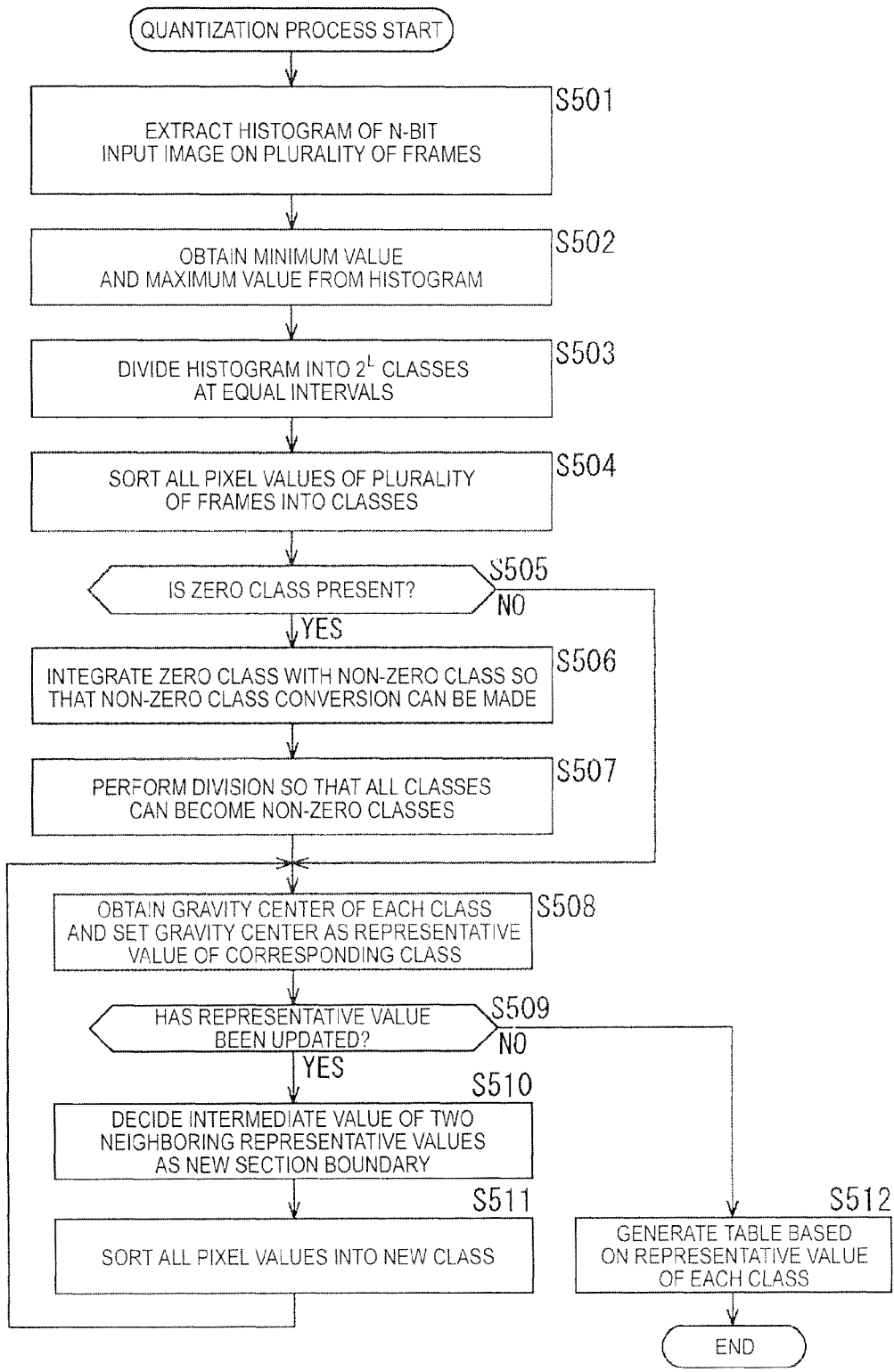
FIG. 23 is a flowchart for explaining an example of a quantization process.

Next, an example of the flow of the quantization process executed by the image processing apparatus 500 will be described with reference to the flowchart of FIG. 23. This quantization process is for generating a table, in which a representative value of each class is associated with an index, used for quantization (the bit depth transform process).

When the quantization process starts, the multi-frame input unit 501 supplies pixel values for every two or more frames. In step S501, the histogram generating unit 502 extracts a histogram of an input image in which a bit depth of a pixel value is N bits on a plurality of frames. In step S502, the histogram generating unit 502 obtains a minimum value and a maximum value from the histogram.

In step S503, the class boundary deciding unit 503 divides the histogram into $2^L$ classes at equal intervals. In step S504, the class configuring unit 504 sorts all pixel values of a plurality of frames into one of classes divided in step S503.

In step S505, the zero class detecting unit 505 determines whether or not a zero class is present. When it is determined that a zero class is present, the process proceeds to step S506. In step S506, the class integrating unit 511 integrates a zero class with a non-zero class so that non-zero class conversion can be made. In step S507, the class dividing unit 512 divides the integrated class so that all divided classes can become non-zero classes.

When the process of step S507 ends, the class dividing unit 512 causes the process to proceed to step S508. However, when it is determined in step S505 that no zero class is present, the zero class detecting unit 505 causes the process to proceed to step S508.

In step S508, the quantization representative value deciding unit 507 obtains a gravity center of each class and sets the gravity center as a representative value of a corresponding class. In step S509, the quantization representative value deciding unit 507 determines whether or not the representative value has been updated by the process of step S508. When it is determined that the representative value has been newly set or has been updated, the quantization representative value deciding unit 507 causes the process to proceed to step S510.

In step S510, the class boundary deciding unit 503 decides an intermediate value of two neighboring representative values as a section boundary of a new class. In step S511, the class configuring unit 504 sorts all pixel values of a plurality of frames into a new class, and causes the process to return to step S508. Then, step S508 and the subsequent processes are repeated.

Meanwhile when it is determined in step S509 that the representative value has not been updated, the quantization representative value deciding unit 507 causes the process to proceed to step S512.

In step S512, the table generating unit 508 defines each class (a section boundary or a representative value), and generates a table in which a representative value of each class is associated with an index of a corresponding class. When the process of step S512 ends, the index image generating unit 508 ends the quantization process.

By performing the quantization process in the above-described way, the image processing apparatus 500 can implement non-zero class conversion of all classes without reducing the number of classes. Further, the image processing apparatus 500 can sufficiently suppress quantization error, even on a sparse image that does not supply a minimum error in the quantization of the Lloyd-Max technique of the related art, and can generate the table so that a minimum error can be given.

[Image Processing Apparatus that Performs Bit Depth Transform]

The table generated in the above-described way is used for quantization/inverse quantization.

Figure 24:
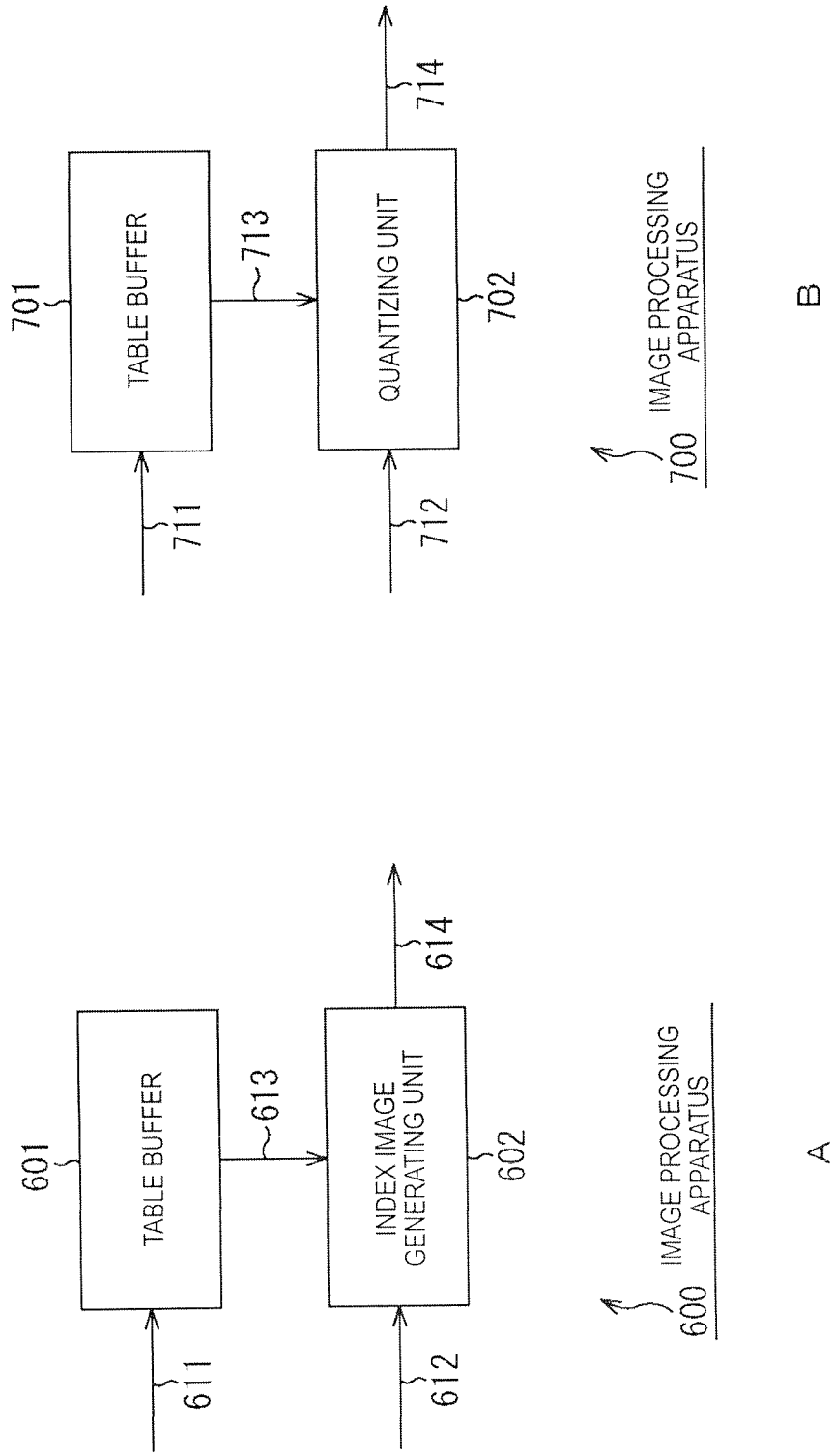
FIGS. 24A and 24B are block diagrams illustrating an example of a main configuration of an image processing apparatus that performs quantization and inverse quantization.

FIGS. 24A and 24B are block diagrams illustrating an example of a main configuration of an image processing apparatus that performs quantization or inverse quantization in this case. FIG. 24A is a block diagram illustrating an example of a main configuration of an image processing apparatus that performs quantization using the table generated by the image processing apparatus 500.

As illustrated in FIG. 24A, an image processing apparatus 600 in this case includes a table buffer 601 and an index image generating unit 602. The table buffer 601 acquires the table generated by the image processing apparatus 500 (arrow 611) and stores the table. The index image generating unit 602 acquires the table from the table buffer 601 (arrow 613), and acquires a pixel value of a quantization process target (arrow 612). The index image generating unit 602 specifies a class corresponding to each pixel value of a quantization process target (bit depth transform target) using the table, transforms each pixel value into a representative value of a corresponding class, and transforms the representative value into an index (performs the quantization process). The index image generating unit 602 outputs the obtained index image (arrow 614).

As described above, the image processing apparatus 600 can easily perform quantization using the table.

FIG. 24B is a block diagram illustrating an example of a main configuration of an image processing apparatus that performs inverse quantization using the table generated by the image processing apparatus 500.

As illustrated in FIG. 24B, an image processing apparatus 700 in this case includes a table buffer 701 and an inverse quantizing unit 702. The table buffer 701 acquires the table generated by the image processing apparatus 500 (arrow 711), and stores the table. The inverse quantizing unit 702 acquires the table from the table buffer 701 (arrow 713), and acquires an index image of an inverse quantization process (arrow 712). The inverse quantizing unit 702 transforms each index into a representative value of a class corresponding to the index (performs an inverse quantization process) using the table. The inverse quantizing unit 702 outputs the obtained image (arrow 714).

As described above, the image processing apparatus 700 can easily perform inverse quantization using the table.

The above description has been made in connection with the example in which a table common to a plurality of images (frame images) arranged in a time axis direction is generated. However, a table common to a plurality of images may be generated without being limited to the time axis direction. For example, a table common to a plurality of still images may be generated, and a table common to a left eye image and a right eye image in a stereoscopic moving image format such as a side-by-side format may be generated. A generating method is the same as in the case of a plurality of frames described above.

For example, the present technology can be appropriately used for bit depth transform (or inverse transform) performed on particularly, an image having a high bit depth such as an image read from an imaging element, an image scanned by a digital scanner, a medical image, an electron microscope image, a digital cinema image, or an image of broadcasting quality. By applying the present technology, deterioration in image quality of an image restored after bit depth transform and inverse transform compared to an original image can be suppressed.

The image processing apparatuses described in the above embodiments may be combined into one image processing apparatus. For example, one image processing apparatus including the image processing apparatus 100 as a quantizing unit and the image processing apparatus 300 as an inverse quantizing unit may be provided. Further, for example, one image processing apparatus including the image processing apparatus 200 as a quantizing unit and the image processing apparatus 400 as an inverse quantizing unit may be provided. Further, for example, one image processing apparatus in which the image processing apparatus 500 to the image processing apparatus 700 are integrated may be provided.

Each apparatus described above may include components other than those described above. For example, each apparatus described above may be configured as equipment or a device using an image captured by an imaging element (a CMOS sensor or a CCD sensor), a compression circuit for writing an imaging element image in a memory, a digital camera, a moving picture camcorder, a medical image camera, a medical endoscope, a monitoring camera, a digital cinema shooting camera, a binocular image camera, a multi-view image camera, a memory reduction circuit of an LSI chip, an authoring tool on a personal computer (PC), a software module thereof, or the like. Further, each apparatus described above may be configured as a system including a plurality of apparatuses as well as a single apparatus.

7. Seventh Embodiment

[Personal Computer]

The series of processes described above can be realized by hardware or software. In such a case, a personal computer such as the one shown in FIG. 25 can be configured, for example.

Figure 25:
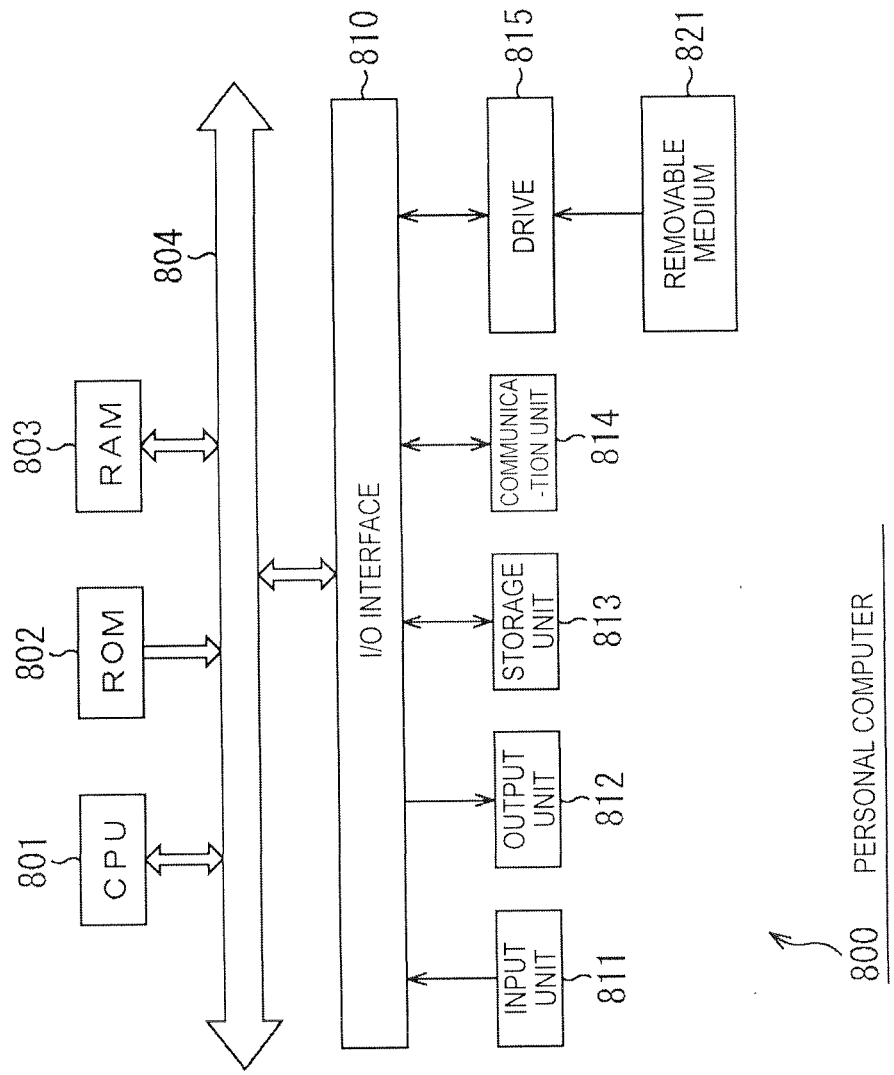
FIG. 25 is a block diagram illustrating an example of a main configuration of a personal computer.

In FIG. 25, a central processing unit (CPU) 801 of a personal computer 800 executes various processes according to a program stored in a read only memory (ROM) 802 or a program loaded from a storage unit 813 to a random access memory (RAM) 803. In the RAM 803, data that is necessary for executing the various processes by the CPU 801 is appropriately stored.

The CPU 801, the ROM 802, and the RAM 803 are connected mutually by a bus 804. Also, an input/output interface 801 is connected to the bus 804.

An input unit 811 that includes a keyboard and a mouse, an output unit 812 that includes a display composed of a cathode ray tube (CRT) display, a liquid crystal display (LCD) and a speaker, a storage unit 813 that is configured using a solid state drive (SSD) such as a flash memory or a hard disk, and a communication unit 814 that is configured using a wired local area network (LAN) or wireless LAN interface and a modem are connected to the input/output interface 810. The communication unit 814 executes communication processing through a network including the Internet.

A drive 815 is connected to the input/output interface 810 according to necessity, a removable medium 821 such as a magnetic disk, an optical disc, a magneto optical disc, or a semiconductor memory is appropriately mounted, and a computer program that is read from the removable media 821 is installed in the storage unit 813 according to necessity.

When the series of processes is executed by the software, a program forming the software is installed through a network or a recording medium.

The recording medium may be configured using the removable medium 821 illustrated in FIG. 25 that is composed of a magnetic disk (including a floppy disk), an optical disc (including a compact disc-read only memory (CD-ROM) and a digital versatile disc (DVD)), a magneto optical disc (including a mini-disc (MD)), or a semiconductor memory, which is distributed to provide a program to a user and has a recorded program, different from a device body, and may be configured using a hard disk that is included in the ROM 802 provided to the user in a state embedded in the device body in advance having a recorded program or the storage unit 813.

It should be noted that the program executed by a computer may be a program that is processed in time series according to the sequence described in this specification or a program that is processed in parallel or at necessary timing such as upon calling.

It should be also noted that, in this specification, the steps describing the program stored in the recording medium include not only a process performed in time series according to the sequence shown therein but also a process executed in parallel or individually, not necessarily performed in time series.

Further, in this specification, "system" refers to a whole device composed of a plurality of devices.

Further, an element described as a single device (or processing unit) above may be configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, an embodiment of the present disclosure is not limited to the embodiments described above, and various changes and modifications may be made without departing from the scope of the disclosure.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An image processing apparatus, comprising:

a zero class detecting unit that detects a zero class in which an appearance frequency of a pixel value is zero from among a plurality of classes into which pixel values of an image are classified according to pixel value magnitude; and a non-zero class converting unit that converts the zero class into a non-zero class in which the appearance frequency of the pixel value is one or more, without updating a total number of the classes, by updating a range of the zero class detected by the zero class detecting unit.

(2)

The image processing apparatus according to (1), wherein the non-zero class converting unit includes:

a class integrating unit that integrates a zero class detected by the zero class detecting unit into a neighboring class until the appearance frequency of the pixel value is equal to or more than the number of integrated classes; and a class dividing unit that divides a class integrated by the class integrating unit into classes which are equal in number to the number of classes before integration such that all classes become non-zero classes.

(3)

The image processing apparatus according to (1) or (2), further comprising:

a class boundary deciding unit that decides a boundary of the class;

a class configuring unit that allocates each pixel value to each class delimited by the boundary decided by the class boundary deciding unit according to a value thereof; and a representative value deciding unit that calculates a gravity center of a pixel value allocated by the class configuring unit in each class delimited by the boundary decided by the class boundary deciding unit and decides the gravity center as a representative value.

(4)

The image processing apparatus according to (3), wherein the class boundary deciding unit decides the boundary so that a range between a maximum value and a minimum value of the pixel value is divided into classes which are smaller in number than a bit depth of the pixel value.

(5)

The image processing apparatus according to (3) or (4), wherein the representative value deciding unit calculates the gravity center in each class and decides the gravity center as the representative value after the non-zero class converting unit converts a zero class into a non-zero class.

(6)

The image processing apparatus according to (5), wherein the class boundary deciding unit decides an intermediate value of representative values of neighboring classes decided by the representative value deciding unit as the boundary of the class.

(7)

The image processing apparatus according to any one of (3) to (6), further comprising:

a table generating unit that generates a table in which a representative value of each class decided by the representative value deciding unit is associated with an index of each class.

(8)

The image processing apparatus according to (7), further comprising:

a transforming unit that transforms each pixel value of the image into a representative value, of a class corresponding to the pixel value, decided by the representative value deciding unit; and an index image generating unit that transforms the representative value transformed from each pixel value by the transforming unit into an index which is identification information of the class of the representative value using the table generated by the table generating unit.

(9)

The image processing apparatus according to (7) or (8), further comprising:

an inverse quantizing unit that transforms the index into the representative value using the table generated by the table generating unit.

(10)

The image processing apparatus according to any one of (7) to (9), wherein the class boundary deciding unit decides the boundary so that a range between a maximum value and a minimum value of all pixels of a plurality of images is divided into a plurality of classes, the class configuring unit allocates all pixel values of the plurality of images to classes delimited by the boundary decided by the class boundary deciding unit according to a value thereof, and the table generating unit generates a table, common to the plurality of images, in which the representative value of each class decided by the representative value deciding unit is associated with an index of each class.

(11)

The image processing apparatus according to any one of (3) to (10), further comprising:

an image block dividing unit that divides the image into a plurality of blocks, wherein each of the class boundary deciding unit, the class configuring unit, the representative value deciding unit, the zero class detecting unit, and the non-zero class converting unit independently performs a process for each of the blocks divided from the image by the image block dividing unit.

(12)

The image processing apparatus according to (11), further comprising:

an inverse quantizing unit that independently performs a process for transforming the index into the representative value for each block using the table generated by the table generating unit.

(13)

An image processing method of an image processing apparatus, comprising:

detecting, at a zero class detecting unit, a zero class in which an appearance frequency of a pixel value is zero from among a plurality of classes into which pixel values of an image are classified according to pixel value magnitude; and converting, at a non-zero class converting unit, the zero class into a non-zero class in which the appearance frequency of the pixel value is one or more, without updating a total number of the classes, by updating a range of the detected zero class.

The present disclosure contains subject matter related to that disclosed in Japanese Priority Patent Application JP 2011-128879 filed in the Japan Patent Office on Jun. 9, 2011, the entire content of which is hereby incorporated by reference.

What is claimed is:

1. An image processing apparatus, comprising:
a zero class detecting unit that detects a zero class in which an appearance frequency of a pixel value is zero from among a plurality of classes into which pixel values of an image are classified according to pixel value magnitude; and
a non-zero class converting unit that converts the zero class into a non-zero class in which the appearance frequency of the pixel value is one or more, without updating a total number of the classes, by updating a range of the zero class detected by the zero class detecting unit.

2. The image processing apparatus according to claim 1, wherein the non-zero class converting unit includes:
a class integrating unit that integrates a zero class detected by the zero class detecting unit into a neighboring class until the appearance frequency of the pixel value is equal to or more than the number of integrated classes; and
a class dividing unit that divides a class integrated by the class integrating unit into classes which are equal in number to the number of classes before integration such that all classes become non-zero classes.

3. The image processing apparatus according to claim 1, further comprising:
a class boundary deciding unit that decides a boundary of the class;
a class configuring unit that allocates each pixel value to each class delimited by the boundary decided by the class boundary deciding unit according to a value thereof; and
a representative value deciding unit that calculates a gravity center of a pixel value allocated by the class configuring unit in each class delimited by the boundary decided by the class boundary deciding unit and decides the gravity center as a representative value.

4. The image processing apparatus according to claim 3, wherein the class boundary deciding unit decides the boundary so that a range between a maximum value and a minimum value of the pixel value is divided into classes which are smaller in number than a bit depth of the pixel value.

5. The image processing apparatus according to claim 3, wherein the representative value deciding unit calculates the gravity center in each class and decides the gravity center as the representative value after the non-zero class converting unit converts a zero class into a non-zero class.

6. The image processing apparatus according to claim 5, wherein the class boundary deciding unit decides an intermediate value of representative values of neighboring classes decided by the representative value deciding unit as the boundary of the class.

7. The image processing apparatus according to claim 3, further comprising:
a table generating unit that generates a table in which a representative value of each class decided by the representative value deciding unit is associated with an index of each class.

8. The image processing apparatus according to claim 7, further comprising:
a transforming unit that transforms each pixel value of the image into a representative value, of a class corresponding to the pixel value, decided by the representative value deciding unit; and
an index image generating unit that transforms the representative value transformed from each pixel value by the transforming unit into an index which is identification information of the class of the representative value using the table generated by the table generating unit.

9. The image processing apparatus according to claim 7, further comprising:
an inverse quantizing unit that transforms the index into the representative value using the table generated by the table generating unit.

10. The image processing apparatus according to claim 7, wherein the class boundary deciding unit decides the boundary so that a range between a maximum value and a minimum value of all pixels of a plurality of images is divided into a plurality of classes,
the class configuring unit allocates all pixel values of the plurality of images to classes delimited by the boundary decided by the class boundary deciding unit according to a value thereof, and
the table generating unit generates a table, common to the plurality of images, in which the representative value of each class decided by the representative value deciding unit is associated with an index of each class.

11. The image processing apparatus according to claim 3, further comprising:
an image block dividing unit that divides the image into a plurality of blocks,
wherein each of the class boundary deciding unit, the class configuring unit, the representative value deciding unit, the zero class detecting unit, and the non-zero class converting unit independently performs a process for each of the blocks divided from the image by the image block dividing unit.

12. The image processing apparatus according to claim 11, further comprising:
an inverse quantizing unit that independently performs a process for transforming the index into the representative value for each block using the table generated by the table generating unit.

13. An image processing method of an image processing apparatus, comprising:
detecting, at a zero class detecting unit, a zero class in which an appearance frequency of a pixel value is zero from among a plurality of classes into which pixel values of an image are classified according to pixel value magnitude; and
converting, at a non-zero class converting unit, the zero class into a non-zero class in which the appearance frequency of the pixel value is one or more, without updating a total number of the classes, by updating a range of the detected zero class.

* * * * *